US011859098B2

(12) United States Patent
Ventuleth et al.

(10) Patent No.: US 11,859,098 B2
(45) Date of Patent: Jan. 2, 2024

(54) FORMULAS AND METHODS FOR MAKING SHELF-STABLE ANTIMICROBIAL BIPHASIC POLYMERS

(71) Applicant: HRL Laboratories, LLC, Malibu, CA (US)

(72) Inventors: Michael Ventuleth, Camarillo, CA (US); Andrew Nowak, Los Angeles, CA (US); Adam Gross, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 17/989,199

(22) Filed: Nov. 17, 2022

(65) Prior Publication Data

US 2023/0090180 A1    Mar. 23, 2023

Related U.S. Application Data

(60) Continuation-in-part of application No. 17/852,307, filed on Jun. 28, 2022, and a continuation-in-part of application No. 17/713,356, filed on Apr. 5, 2022, said application No. 17/852,307 is a continuation-in-part of application No. 17/713,356, filed on Apr. 5, 2022, which is a continuation-in-part of application No. 17/564,903, filed on Dec. 29, 2021, now Pat. No. 11,692,109, said application No. 17/713,356 is a continuation of application No. 17/090,968, filed on Nov. 6, 2020, now Pat. No. 11,369,109, said application No. 17/564,903 is a continuation of application No. 16/876,075, filed on May 17, 2020, now Pat. No. 11,225,589, which is a division of application No. 15/957,638, filed on Apr. 19, 2018, now Pat. No. 10,689,542.

(60) Provisional application No. 63/305,421, filed on Feb. 1, 2022, provisional application No. 63/289,241, filed on Dec. 14, 2021, provisional application No. 63/236,311, filed on Aug. 24, 2021, provisional application No. 63/037,921, filed on Jun. 11, 2020, provisional application No. 62/634,990, filed on Feb. 26, 2018, provisional application No. 62/607,402, filed on Dec. 19, 2017, provisional application No. 62/543,590, filed on Aug. 10, 2017.

(51) Int. Cl.
| | | |
|---|---|---|
| *C09D 171/02* | (2006.01) | |
| *C08G 65/00* | (2006.01) | |
| *C08L 101/02* | (2006.01) | |
| *C09D 201/02* | (2006.01) | |
| *C08G 65/22* | (2006.01) | |
| *C08G 81/00* | (2006.01) | |

(52) U.S. Cl.
CPC ......... *C09D 171/02* (2013.01); *C08G 65/007* (2013.01); *C08G 65/226* (2013.01); *C08G 81/00* (2013.01); *C08L 101/02* (2013.01); *C09D 201/02* (2013.01); *C08G 2650/22* (2013.01); *C08G 2650/48* (2013.01); *C08G 2650/58* (2013.01)

(58) Field of Classification Search
CPC ...... C09D 171/02; C09D 201/02; C09D 5/14; C08G 65/007; C08G 65/226; C08G 81/00; C08G 2650/22; C08G 2650/48; C08G 2650/58; C08L 101/02; C08L 71/02; C08L 87/005; A01P 1/00; A01N 25/10

See application file for complete search history.

(56) References Cited

U.S. PATENT DOCUMENTS

| | | |
|---|---|---|
| 3,435,003 A | 3/1969 | Craven |
| 3,810,874 A | 5/1974 | Mitsch et al. |
| 3,847,978 A | 11/1974 | Sianesi et al. |
| 4,777,224 A | 10/1988 | Gorzynski et al. |
| 4,956,438 A | 9/1990 | Ruetman et al. |
| 5,032,666 A | 7/1991 | Hu et al. |

(Continued)

FOREIGN PATENT DOCUMENTS

| | | |
|---|---|---|
| CN | 106243966 B | 12/2016 |
| EP | 1558661 B1 | 12/2012 |

(Continued)

OTHER PUBLICATIONS

International Search Report and Written Opinion, PCT/US2022/050334, dated Mar. 29, 2023.

(Continued)

*Primary Examiner* — Andrew J. Oyer
(74) *Attorney, Agent, or Firm* — O'Connor & Company; Ryan P. O'Connor

(57) ABSTRACT

Disclosed herein is a shelf-stable, two-part formula for making an antimicrobial biphasic polymer. Some variations provide a two-part formula for fabricating a biphasic polymer, wherein the two-part formula consists essentially of (A) a first liquid volume, wherein the first liquid volume comprises: a structural phase containing a solid structural polymer; a transport phase containing a solid transport polymer; a chain extender; a curing catalyst; a first solvent; and (B) a second liquid volume that is volumetrically isolated from the first liquid volume, wherein the second liquid volume comprises: a crosslinker that is capable of crosslinking the solid structural polymer with the solid transport polymer; and a second solvent. An antimicrobial agent (e.g., quaternary ammoniums salts) may be contained in the first liquid volume or in the second liquid volume. Methods of making and using the antimicrobial biphasic polymer are described.

24 Claims, No Drawings

(56) References Cited

U.S. PATENT DOCUMENTS

| | | | |
|---|---|---|---|
| 5,084,315 A | 1/1992 | Karimi et al. | |
| 5,189,135 A | 2/1993 | Cozzi et al. | |
| 5,290,418 A | 3/1994 | Menchen et al. | |
| 5,332,798 A | 7/1994 | Ferreri et al. | |
| 5,589,552 A | 12/1996 | Simeone et al. | |
| 5,798,409 A | 8/1998 | Ho | |
| 5,798,415 A | 8/1998 | Corpart et al. | |
| 5,880,183 A * | 3/1999 | Yeo .................. | C09D 129/04 |
| | | | 427/393 |
| 6,071,564 A | 6/2000 | Marchetti et al. | |
| 6,183,872 B1 | 2/2001 | Tanaka et al. | |
| 6,579,835 B2 | 6/2003 | Scicchitano et al. | |
| 6,926,937 B2 | 8/2005 | Extrand et al. | |
| 6,992,132 B2 | 1/2006 | Trombetta et al. | |
| 7,655,310 B2 | 2/2010 | Trombetta | |
| 9,136,562 B2 | 9/2015 | Singh et al. | |
| 9,226,508 B2 | 1/2016 | Uhlmann et al. | |
| 2002/0016267 A1 | 2/2002 | Scicchitano et al. | |
| 2003/0229176 A1 | 12/2003 | Trombetta et al. | |
| 2004/0019143 A1 | 1/2004 | Koloski et al. | |
| 2005/0164010 A1 | 7/2005 | Trombetta | |
| 2006/0189750 A1 | 8/2006 | Maier et al. | |
| 2007/0298216 A1 | 12/2007 | Jing et al. | |
| 2008/0219944 A1 | 9/2008 | Longo et al. | |
| 2010/0324205 A1 | 12/2010 | Maier et al. | |
| 2011/0177987 A1 | 7/2011 | Lenting et al. | |
| 2011/0218290 A1 | 9/2011 | Webster et al. | |
| 2011/0229750 A1 | 9/2011 | McLellan et al. | |
| 2011/0213085 A1 | 11/2011 | Tonelli et al. | |
| 2012/0136120 A1 | 5/2012 | Bosman | |
| 2012/0164565 A1 | 6/2012 | Qiu | |
| 2014/0113144 A1 | 4/2014 | Loth et al. | |
| 2014/0127516 A1 | 5/2014 | Wang et al. | |
| 2014/0162022 A1 | 6/2014 | Nowak et al. | |
| 2015/0158969 A1 | 6/2015 | Nowak | |
| 2015/0329453 A1 | 11/2015 | Guarda et al. | |
| 2016/0028114 A1 | 1/2016 | Pratt et al. | |
| 2016/0201005 A1 | 7/2016 | Nowak et al. | |
| 2017/0174911 A1 | 6/2017 | Nowak et al. | |
| 2019/0106525 A1 | 4/2019 | Becker et al. | |

FOREIGN PATENT DOCUMENTS

| | | |
|---|---|---|
| KR | 20180071516 A | 10/2018 |
| WO | 1997035919 A1 | 10/1997 |
| WO | 2013158360 A1 | 10/2013 |
| WO | 2021039749 A1 | 3/2021 |

OTHER PUBLICATIONS

Ashish Vaidya and Manoj K. Chaudhury, "Synthesis and Surface Properties of Environmentally Responsive Segmented Polyurethanes," Journal of Colloid and Interface Science 249, 235-245 (2002).

Siochi et al., "Engineered Surfaces for Mitigation of Insect Residue Adhesion" NF1676L-15481 SAMPE 2013; May 6-9, 2013; Long Beach, CA; United States.

Wohl et al., "Evaluation of commercially available materials to mitigate insect residue adhesion on wing leading edge surfaces," Progress in Organic Coatings 76 (2013) 42-50.

Kok et al., "Influence of surface characteristics on insect residue adhesion to aircraft leading edge surfaces," Progress in Organic Coatings 76 (2013) 1567-1575.

Lee et al., "Zwitter-Wettability and Antifogging Coatings with Frost-Resisting Capabilities," ACS Nano 7 (2013) 2172-2185.

Chen et al., "Robust Prototypical Anti-icing Coatings with a Self-lubricating Liquid Water Layer between Ice and Substrate," ACS Appl. Mater. Interfaces 5 (2013) 4026-4030.

Turri et al., "Waterborne Anionomeric Polyurethane-Ureas from Functionalized Fluoropolyethers," Journal of Applied Polymer Science, vol. 93, 136-144 (2004).

Dou et al., "Anti-icing Coating with an Aqueous Lubricating Layer," ACS Appl. Mater. Interfaces 2014, 6, 6998-7003.

Wang et al., "Investigation of the role of hydrophilic chain length in amphiphilic perfluoropolyether/poly(ethylene glycol) networks: towards high-performance antifouling coatings," Biofouling vol. 27, No. 10, Nov. 2011, 1139-1150.

Chen et al., "A Thermally Re-mendable Cross-Linked Polymeric Material," Science 295 (5560), 1698-1702, Mar. 1, 2002.

Oster et al., "Photoreduction of Metal Ions by Visible Light," Departmenotf Chemistry, Polytechnic Institute of Brooklyn, 135th National meeting of the American Chemical Society, Nov. 5, 1959.

Wojtecki et al., "Using the dynamic bond to access macroscopically responsive structurally dynamic polymers," Nature Materials vol. 10, Jan. 2011.

Chen et al., "Icephobic Surfaces Induced by Interfacial Nonfrozen Water" ACS Appl. Mater. Interfaces 2017, 9, 4202-4214.

Chernyy et al., "Superhydrophilic Polyelectrolyte Brush Layers with Imparted Anti-Icing Properties: Effect of Counter Ions" ACS Appl. Mater. Interfaces 2014, 6, 6487-6496.

Ryerson, "Assessment of Superstructure Ice Protection as Applied to Offshore Oil Operations Safety" US Army Research, 49, 2009.

Lauten et al., "Efficacies of Novel N-Halamine Disinfectants against *Salmonella* and *Pseudomonas* Species", Applied and Environmental Microbiology, Apr. 1992, p. 1240-1243.

Bonino et al., "Electrochemical properties of copper-based polymer electrolytes", Electrochimica Acta vol. 37, Issue 9, Jan. 1992; see Abstract.

Chin et al., "Stability of SARS-CoV-2 in different environmental conditions", Lancet Microbe 2020; published online Apr. 2, https://doi.org/10.1016/S2666-5247(20)30003-3.

World Health Organization, "Transmission of SARS-CoV-2: implications for infection prevention precautions", Jul. 9, 2020.

Santos et al., "Recent Developments in Antimicrobial Polymers: A Review", Materials 2016, 9, 599.

US Environmental Protection Agency Office of Pesticide Programs, "Interim Method for the Evaluation of Bactericidal Activity of Hard, Non-porous Copper-Containing Surface Products" Jan. 23, 2020.

US Environmental Protection Agency Office of Pesticide Programs, "Interim Method for Evaluating the Efficacy of Antimicrobial Surface Coatings" Oct. 2, 2020.

\* cited by examiner

FORMULAS AND METHODS FOR MAKING SHELF-STABLE ANTIMICROBIAL BIPHASIC POLYMERS

PRIORITY DATA

This patent application claims priority to U.S. Provisional Patent App. No. 63/305,421, filed on Feb. 1, 2022, which is hereby incorporated by reference herein.

This patent application is also a continuation-in-part application of U.S. patent application Ser. No. 17/564,903, filed on Dec. 29, 2021, which is a continuation application of U.S. Pat. No. 11,225,589, issued on Jan. 18, 2022, which is a divisional of U.S. Pat. No. 10,689,542, issued on Jun. 23, 2020, which in turn claims priority to (a) U.S. Provisional Patent App. No. 62/543,590, filed on Aug. 10, 2017; (b) U.S. Provisional Patent App. No. 62/607,402, filed on Dec. 19, 2017; and (c) U.S. Provisional Patent App. No. 62/634,990, filed on Feb. 26, 2018, each of which is hereby incorporated by reference herein.

This patent application is also a continuation-in-part application of U.S. patent application Ser. No. 17/713,356, filed on Apr. 5, 2022, which is a continuation application of U.S. Pat. No. 11,369,109, issued on Jun. 28, 2022, which is a non-provisional application claiming priority to U.S. Provisional Patent App. No. 63/037,921, filed on Jun. 11, 2020, each of which is hereby incorporated by reference herein.

This patent application is also a continuation-in-part application of U.S. patent application Ser. No. 17/852,307, filed on Jun. 28, 2022, which is a non-provisional application claiming priority to U.S. Provisional Patent App. No. 63/236,311, filed on Aug. 24, 2021, each of which is hereby incorporated by reference herein. U.S. patent application Ser. No. 17/852,307 is also a continuation-in-part application of U.S. patent application Ser. No. 17/713,356, filed on Apr. 5, 2022, which is a continuation application of U.S. Pat. No. 11,369,109, issued on Jun. 28, 2022, which is a non-provisional application claiming priority to U.S. Provisional Patent App. No. 63/037,921, filed on Jun. 11, 2020, each of which is hereby incorporated by reference herein.

FIELD OF THE INVENTION

The present invention generally relates to formulas and methods for making and using antimicrobial biphasic polymers.

BACKGROUND OF THE INVENTION

Coronavirus disease 2019 ("COVID-19") is caused by severe acute respiratory syndrome coronavirus 2 ("SARS-CoV-2"). The COVID-19 pandemic emphasized the importance of environmental cleanliness and hygiene management involving a wide variety of surfaces. Despite the strict hygiene measures which have been enforced, it has proven to be very difficult to sanitize surfaces all of the time. Even when sanitized, surfaces may get contaminated again.

Respiratory secretions or droplets expelled by infected individuals can contaminate surfaces and objects, creating fomites (contaminated surfaces). Viable SARS-CoV-2 virus can be found on contaminated surfaces for periods ranging from hours to many days, depending on the ambient environment (including temperature and humidity) and the type of surface. See, for example, Van Doremalen et al., "Aerosol and surface stability of SARS-CoV-2 as compared with SARS-CoV-1", *New England Journal of Medicine* 2020; 382: 1564-1567; Pastorino et al., "Prolonged Infectivity of SARS-CoV-2 in Fomites", *Emerging Infectious Diseases* 2020; 26(9); and Chin et al., "Stability of SARS-CoV-2 in different environmental conditions", *The Lancet Microbe*, e10, Apr. 2, 2020.

There is consistent evidence of SARS-CoV-2 contamination of surfaces and the survival of the virus on certain surfaces. People who come into contact with potentially infectious surfaces often also have close contact with the infectious person, making the distinction between respiratory droplet and fomite transmission difficult to discern. However, fomite transmission is considered a feasible mode of transmission for SARS-CoV-2, given consistent findings about environmental contamination in the vicinity of infected cases and the fact that other coronaviruses and respiratory viruses can transmit this way (World Health Organization, "Transmission of SARS-CoV-2: implications for infection prevention precautions", Jul. 9, 2020 via www.who.int). Virus transmission may also occur indirectly through touching surfaces in the immediate environment or objects contaminated with virus from an infected person, followed by touching the mouth, nose, or eyes. While use of face masks has, generally speaking, become common, use of hand gloves has not. Even with gloves, touching of mouth, nose, and eyes still frequently occurs, following the touch of a contaminated surface.

Therefore, there is a desire to prevent the transmission of pathogens (such as, but not limited to, SARS-CoV-2) via surfaces. One method of reducing pathogen transmission is to reduce the period of human vulnerability to infection by reducing the period of viability of SARS-CoV-2 on solids and surfaces.

Surfaces may be treated with antimicrobial active, such as bleach and quaternary ammoniums salts, or UV light, to kill bacteria and destroy viruses within a matter of minutes. Antimicrobial actives in liquids are capable of inactivating at least 99.99% of SARS-CoV-2 in as little as 2 minutes, which is attributed to the rapid diffusion of the antimicrobial active to microbes and because water aids microbial dismemberment. However, these approaches cannot always occur in real-time after a surface is contaminated.

Alternatively, antimicrobial coatings may be applied to a surface in order to kill bacteria and/or destroy viruses as they deposit. However, to exceed 99.9% reduction of bacteria and/or viruses, conventional antimicrobial coatings typically require at least 2 hours, a time scale which is longer than indirect human-to-human interaction time, such as in an aircraft or shared vehicle, for example. Existing solid coatings are limited by a low concentration of antimicrobial actives at the surface due to slow antimicrobial active transport. The slow diffusion of antimicrobial actives through the solid coating to the surface, competing with the removal of antimicrobial actives from the surface by human and environmental contact, results in limited availability and requires up to 2 hours to kill 99.9% of bacteria and/or deactivate 99.9% of viruses.

Water improves transport and aids microbial dismemberment. However, single-material coatings have limited water uptake. Swelling with water is often an unwanted characteristic of single-material coatings, since swelling can cause coating weakness and degradation if not designed into the coating.

In view of the aforementioned needs in the art, there is a strong desire for an antimicrobial coating that enables fast transport rates of antimicrobial actives for better effectiveness on deactivating SARS-CoV-2 on surfaces. The coating should be safe, conveniently applied or fabricated, and durable. It is particularly desirable for such a coating to be capable of destroying at least 99.9% of bacteria and/or viruses in 30 minutes of contact.

There remains a need for a shelf-stable formula suitable for making an antimicrobial biphasic polymer.

SUMMARY OF THE INVENTION

Some variations of the invention provide a two-part formula for fabricating a biphasic polymer, wherein the two-part formula consists essentially of:
- (A) a first liquid volume, wherein the first liquid volume comprises:
  - (A)(i) a structural phase containing a solid structural polymer;
  - (A)(ii) a transport phase containing a solid transport polymer;
  - (A)(iii) a chain extender;
  - (A)(iv) a curing catalyst;
  - (A)(v) a first solvent; and
  - (A)(vi) optionally, first additives; and
- (B) a second liquid volume that is volumetrically isolated from the first liquid volume, wherein the second liquid volume comprises:
  - (B)(i) a crosslinker that is capable of crosslinking the solid structural polymer with the solid transport polymer;
  - (B)(ii) a second solvent; and
  - (B)(iii) optionally, second additives.

In some embodiments, the structural phase has a glass-transition temperature $T_g$ of greater than 20° C., such as from about 25° C. to about 300° C.

In some embodiments, the solid structural polymer is selected from non-fluorinated carbon-based polymers. The non-fluorinated carbon-based polymers may be selected from the group consisting of polycarbonates, polyacrylates, polyalkanes, polyurethanes, polyethers, polyureas, polyesters, polyepoxides, and combinations thereof. In some embodiments, the non-fluorinated carbon-based polymers contain hydroxyl reactive groups, amine reactive groups, or both hydroxyl reactive groups and amine reactive groups.

In some embodiments, the solid structural polymer is selected from fluorinated polymers. The fluorinated polymers may be selected from the group consisting of fluorinated polyols, perfluorocarbons, perfluoropolyethers, polyfluoroacrylates, polyfluorosiloxanes, polyvinylidene fluoride, polytrifluoroethylene, and combinations thereof. In some embodiments, the fluorinated polymers contain hydroxyl reactive groups, amine reactive groups, or both hydroxyl reactive groups and amine reactive groups. The fluorinated polymers may be branched with a functionality greater than 2.

In some embodiments, the solid transport polymer is a hygroscopic solid transport polymer selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), modified cellulosic polymers, carboxymethyl cellulose, hydroxyethyl cellulose, hydroxypropyl cellulose, methyl cellulose, and combinations thereof.

In some embodiments, the solid transport polymer is a hydrophobic, non-lipophobic solid transport polymer selected from the group consisting of poly(propylene glycol), poly(tetramethylene glycol), polybutadiene, polycarbonate, polycaprolactone, acrylic polyols, and combinations thereof.

In some embodiments, the solid transport polymer is a hydrophilic solid transport polymer with ionic charge, and wherein the ionic charge is optionally present within the hydrophilic solid transport polymer as carboxylate groups, amine groups, sulfate groups, or phosphate groups.

In some embodiments, the solid transport polymer is an electrolyte solid transport polymer selected from the group consisting of polyethylene oxide, polypropylene oxide, polycarbonates, polysiloxanes, polyvinylidene difluoride, and combinations thereof.

In some embodiments, the transport phase consists essentially of the solid transport polymer. In other embodiments, the transport phase consists essentially of a liquid mixed with the solid transport polymer.

In some embodiments, the crosslinker includes at least one moiety selected from the group consisting of amine, hydroxyl, isocyanate, a blocked isocyanate, epoxide, carbodiimide, and combinations thereof.

In some embodiments, each of the first solvent and the second solvent is independently selected from the group consisting of water, alcohols, polyols, ethers, esters, ketones, aldehydes, carbonates, lactones, sulfoxides, ionic liquids, and combinations thereof.

In some embodiments, each of the first additives and the second additives is independently selected from the group consisting of buffers, UV stabilizers, fillers, pigments, flattening agents, flame retardants, salts, surfactants, defoamers, dispersants, wetting agents, antioxidants, adhesion promoters, leveling agents, and combinations thereof.

In some embodiments, an antimicrobial agent is present within the first liquid volume, within the second liquid volume, or within both the first liquid volume and the second liquid volume. In these embodiments, the biphasic polymer to be fabricated from the two-part formula is an antimicrobial biphasic polymer.

When the antimicrobial agent is present, it may be dissolved or suspended in the first solvent. Alternatively, or additionally, the antimicrobial agent may be dissolved or suspended in second solvent. In certain embodiments, the antimicrobial agent may be contained within the first liquid volume but not dissolved in the first solvent. In certain embodiments, the antimicrobial agent may be contained within the second liquid volume but not dissolved in the second solvent. In specific embodiments, the antimicrobial agent may be contained within the first and second liquid volumes but not necessarily dissolved or suspended in either the first solvent or the second solvent.

In some embodiments, there initially is no antimicrobial agent. The antimicrobial agent may be added at a later time, such as right before use of the biphasic polymer as an antimicrobial biphasic polymer. Also, the antimicrobial agent may be replenished at various times during or after use of the antimicrobial biphasic polymer.

In some embodiments, the antimicrobial agent is selected from quaternary ammonium molecules. The quaternary ammonium molecules may be selected from benzalkonium chloride, benzethonium chloride, methylbenzethonium chloride, cetalkonium chloride, cetylpyridinium chloride, cetyl trimethylammonium chloride, alkyltrimethylammonium chloride, tetraethylammonium chloride, didecyldimethylammonium chloride, dodecyl-dimethyl-(2-phenoxyethyl)azanium chloride, bromide versions thereof, or a combination of the foregoing. Other salts of quaternary ammonium may be employed as quaternary ammonium molecules.

In some embodiments, the antimicrobial agent is selected from metal ions. The metal ions are optionally selected from the group consisting of silver, copper, zinc, and combinations thereof.

In some embodiments, the antimicrobial agent is selected from metal oxides. The metal oxides are optionally selected from copper (I) oxide, copper (II) oxide, zinc oxide, silver oxide, and combinations thereof. The metal oxides may be in the form of metal oxide nanoparticles, microparticles, or a combination thereof.

In some embodiments, the antimicrobial agent is selected from acids. The acids are optionally selected from the group consisting of citric acid, acetic acid, peracetic acid, glycolic acid, lactic acid, succinic acid, pyruvic acid, oxalic acid, hydrochloric acid, and combinations thereof.

In some embodiments, the antimicrobial agent is selected from bases. The bases are optionally selected from the group consisting of ammonia, ammonium hydroxide, sodium hydroxide, potassium hydroxide, sodium bicarbonate, potassium bicarbonate, and combinations thereof.

In some embodiments, the antimicrobial agent is selected from salts. The salts are optionally selected from the group consisting of copper chloride, copper nitrate, copper citrate, copper acetate, zinc chloride, zinc nitrate, zinc citrate, zinc acetate, silver chloride, silver nitrate, silver citrate, silver acetate, and combinations thereof.

In some embodiments, the antimicrobial agent is selected from peroxides. The peroxides are optionally selected from the group consisting of hydrogen peroxide, organic peroxides, and combinations thereof.

In some embodiments, the antimicrobial agent is selected from oxidizing molecules. The oxidizing molecules are optionally selected from the group consisting of hypochlorous acid, hydrogen peroxide, sodium hypochlorite, sodium chlorite, sodium chlorate, calcium hypochlorite, calcium chlorite, calcium chlorate, calcium perchlorate, and combinations thereof.

In some embodiments, the antimicrobial agent is selected from N-halamines that are halogenated with chlorine, bromine, iodine, or a combination thereof.

The two-part formula is preferably shelf-stable. The two-part formula may be contained with a kit. The kit may contain instructions for converting the two-part formula into the biphasic polymer. For example, the instructions may direct a user to make the biphasic polymer by carrying out the following steps:
(a) starting with the two-part formula;
(b) combining the first liquid volume with the second liquid volume, thereby forming a combined liquid volume; and
(c) curing the combined liquid volume to react the crosslinker with the solid structural polymer and the solid transport polymer, thereby generating a biphasic polymer.

Other variations of the invention provide a method of making a biphasic polymer, the method comprising:
(a) providing a two-part formula for fabricating a biphasic polymer, wherein the two-part formula consists essentially of:
  (A) a first liquid volume, wherein the first liquid volume comprises:
    (A)(i) a structural phase containing a solid structural polymer;
    (A)(ii) a transport phase containing a solid transport polymer;
    (A)(iii) a chain extender;
    (A)(iv) a curing catalyst;
    (A)(v) a first solvent; and
    (A)(vi) optionally, first additives; and
  (B) a second liquid volume that is volumetrically isolated from the first liquid volume, wherein the second liquid volume comprises:
    (B)(i) a crosslinker that is capable of crosslinking the solid structural polymer with the solid transport polymer;
    (B)(ii) a second solvent; and
    (B)(iii) optionally, second additives; and
(b) combining the first liquid volume with the second liquid volume, thereby forming a combined liquid volume; and
(c) curing the combined liquid volume to react the crosslinker with the solid structural polymer and the solid transport polymer, thereby generating a biphasic polymer,
wherein the biphasic polymer comprises a discrete solid structural phase comprising the solid structural polymer, wherein the biphasic polymer further comprises a continuous transport phase comprising the solid transport polymer, wherein the solid structural polymer is crosslinked, via the crosslinker, with the solid structural polymer, wherein the continuous transport phase is interspersed within the discrete solid structural phase, and wherein the discrete solid structural phase and the continuous transport phase are separated by an average phase-separation length selected from about 100 nanometers to about 500 microns.

In some methods, the biphasic polymer is characterized by an optical transparency of about 80% or greater, wherein the optical transparency is averaged across light wavelengths from 400 nm to 800 nm, through a 100-micron film of the biphasic polymer at 25° C. and 1 bar.

In some methods, the biphasic polymer is formed as a coating on a bulk object made from a different material.

In some methods, the biphasic polymer is formed at a surface of a bulk object. The bulk object itself may be fabricated from the biphasic polymer itself.

The method may further comprise introducing an antimicrobial agent to the continuous transport phase of the biphasic polymer.

DETAILED DESCRIPTION OF EMBODIMENTS OF THE INVENTION

The compositions (synonymously, formulas), kits, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with any accompanying figures.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

All references to "room temperature" should be understood as about 25° C., which for purposes of this patent application means 25° C.±5° C.

Unless otherwise indicated, all references to $M_n$ in this disclosure mean number-average molecular weight.

In this specification, "antimicrobial agent" is synonymous with "antimicrobial active" and such terms may be used interchangeably.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in a Markush group. Thus in some embodiments not otherwise explicitly recited, any instance of "comprising" may be replaced by "consisting of" or, alternatively, by "consisting essentially of."

The present invention provides a two-part formula with two precursor parts that may be in a kit, in which the two-part formula is designed to form a biphasic polymer, preferably an antimicrobial biphasic polymer.

In the case of antimicrobial polymers, it is preferred that a formula can be distributed to end users and is stable for many months before use. The present disclosure describes various two-part formulas that are shelf-stable while being designed to produce the desired polymers after application and curing on a substrate. The polymers are preferably solventborne polyurethanes or polyureas and are pre-packaged in two-part formula kits, in which an isocyanate is physically and spatially separated from a polyol or polyamine, so that coating does not cure prior to application on a surface. In preferred embodiments, the two-part formula is designed to produce a biphasic polymer containing a discrete structural phase and a continuous transport phase bound together via crosslinking agents.

Commercial applications of the disclosed two-part formulas include, but are not limited to, antimicrobial surfaces in cars, especially shared-ride vehicles, to inhibit the transfer of microbes from one person to another; antimicrobial surfaces in airplanes where UV light cannot reach to sanitize contaminated surfaces; antimicrobial surfaces inside and outside vehicles that may be used to rescue or move people who have been exposed to diseases and pandemics; for antimicrobial surfaces in homes (e.g., kitchens and bathrooms); in restaurants; and on clothing and personal protective equipment. All of these use cases require a convenient formulation to be available for application on surfaces.

Some variations of the invention provide a two-part formula for fabricating a biphasic polymer, wherein the two-part formula consists essentially of:

(A) a first liquid volume, wherein the first liquid volume comprises:
  (A)(i) a structural phase containing a solid structural polymer;
  (A)(ii) a transport phase containing a solid transport polymer;
  (A)(iii) a chain extender;
  (A)(iv) a curing catalyst;
  (A)(v) a first solvent; and
  (A)(vi) optionally, first additives; and
(B) a second liquid volume that is volumetrically isolated from the first liquid volume, wherein the second liquid volume comprises:
  (B)(i) a crosslinker that is capable of crosslinking the solid structural polymer with the solid transport polymer;
  (B)(ii) a second solvent; and
  (B)(iii) optionally, second additives.

In some embodiments, the solid structural polymer is selected from non-fluorinated carbon-based polymers. The non-fluorinated carbon-based polymers may be selected from the group consisting of polycarbonates, polyacrylates, polyalkanes, polyurethanes, polyethers, polyureas, polyesters, polyepoxides, and combinations thereof. In some embodiments, the non-fluorinated carbon-based polymers contain hydroxyl reactive groups, amine reactive groups, or both hydroxyl reactive groups and amine reactive groups.

In some embodiments, the solid structural polymer is selected from fluorinated polymers. The fluorinated polymers may be selected from the group consisting of fluorinated polyols, perfluorocarbons, perfluoropolyethers, polyfluoroacrylates, polyfluorosiloxanes, polyvinylidene fluoride, polytrifluoroethylene, and combinations thereof. In some embodiments, the fluorinated polymers contain hydroxyl reactive groups, amine reactive groups, or both hydroxyl reactive groups and amine reactive groups. The fluorinated polymers may be branched with a functionality greater than 2.

In some embodiments, the structural phase has a glass-transition temperature $T_g$ of greater than 20° C., such as from about 25° C. to about 300° C. The glass-transition temperature $T_g$ of a material characterizes temperatures at which a glass transition is observed. A glass transition is the gradual and reversible transition in amorphous materials (or in amorphous regions within semicrystalline materials) from a hard and relatively brittle "glassy" state into a viscous or rubbery state as the temperature is increased. A glass transition generally occurs over a temperature range and depends on the thermal history; therefore, a test method needs to be defined in order to ascertain a value of $T_g$ for a given material.

In this patent application, the glass-transition temperature $T_g$ is measured according to the equal-areas method described in International Standard ISO 11357-2, "Plastics—Differential scanning calorimetry (DSC)—Part 2: Determination of glass transition temperature and step height", Third Edition, March 2020, which is hereby incorporated by reference. The measurement of $T_g$ uses the energy release on heating in differential scanning calorimetry (DSC). The change in heat flow rate as a function of temperature is recorded and the glass-transition temperature and step height are determined from the curve thus obtained. The glass transition is assigned to the temperature obtained by drawing a vertical line such that the areas between DSC trace and baselines below and above the curve are equal.

As the glass transition is a kinetic phenomenon, the glass-transition temperature depends on the actual cooling rate and annealing conditions below $T_g$. Unperturbed glass transitions are obtained only if cooling and subsequent heating rate are the same and no significant physical aging occurs due to annealing below $T_g$. If a sample is cooled significantly slower or annealed below $T_g$, enthalpy relaxations can occur, resulting in endotherm peaks just above $T_g$. Peaks due to enthalpy relaxation will disappear by extrapolating to zero heating rates. The equal-areas method provides the best procedure to obtain an accurate $T_g$ in the case of occurrence of enthalpy relaxations. The equal-areas method is described in section 10.1.2 of ISO 11357-2, which is hereby incorporated by reference.

Examples of polymers with $T_g<20°$ C. include silicones, polyvinylidene fluoride, polyvinyl fluoride, polychloroprene, polyethylene, polypropylene, and poly(butyl acrylate). Many examples of polymers with $T_g \geq 20°$ C. are provided below.

The preference for $T_g \geq 20°$ C. is based on the use temperature of the antimicrobial structure being about 20° C. If the use temperature is higher, such as 40° C., then the $T_g$ of the solid structural polymer may be about 40° C. or higher. Likewise, in certain situations where the antimicrobial-structure use temperature is lower, such as 0° C., then the $T_g$ of the solid structural polymer may be about 0° C. or higher.

In various embodiments, the glass-transition temperature $T_g$ of the solid structural polymer is about, at least about, or at most about 25° C., 30° C., 35° C., 40° C., 45° C., 50° C., 60° C., 70° C., 80° C., 90° C., 100° C., 110° C., 120° C., 130° C., 140° C., 150° C., 160° C., 170° C., 180° C., 190° C., 200° C., 210° C., 220° C., 230° C., 240° C., 250° C., 260° C., 270° C., 280° C., 290° C., or 300° C., including any intervening ranges (e.g., $T_g$=30-150° C., $T_g$=50-200° C., etc.). Reference to a range of $T_g$ means that a solid structural polymer may be selected such that its single value of $T_g$, measured pursuant to ISO 11357-2, falls within the specified range.

In some embodiments, a high glass-transition temperature (i.e., $T_g \geq 20°$ C.) of the solid structural polymer improves the anti-fouling performance of the antimicrobial structure (e.g., a coating). Structural phases such as poly(butadiene) or poly(tetrahydrofuran) have $T_g<20°$ C. and typically include at least 10 vol % of a fluorinated polyol added to the structural phase to reject stains. Non-fluorinated solid structural polymers are preferred for resisting penetration of external soils into the coating, such as a fluorine-free anti-fouling coating.

In some embodiments, the solid transport polymer is a hygroscopic solid transport polymer selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), modified cellulosic polymers, carboxymethyl cellulose, hydroxyethyl cellulose, hydroxypropyl cellulose, methyl cellulose, and combinations thereof.

In some embodiments, the solid transport polymer is a hydrophobic, non-lipophobic solid transport polymer selected from the group consisting of poly(propylene glycol), poly(tetramethylene glycol), polybutadiene, polycarbonate, polycaprolactone, acrylic polyols, and combinations thereof.

In some embodiments, the solid transport polymer is a hydrophilic solid transport polymer with ionic charge, and wherein the ionic charge is optionally present within the hydrophilic solid transport polymer as carboxylate groups, amine groups, sulfate groups, or phosphate groups.

In some embodiments, the solid transport polymer is an electrolyte solid transport polymer selected from the group consisting of polyethylene oxide, polypropylene oxide, polycarbonates, polysiloxanes, polyvinylidene difluoride, and combinations thereof.

In some embodiments, the transport phase consists essentially of the solid transport polymer. In other embodiments, the transport phase consists essentially of a liquid mixed with the solid transport polymer.

In some embodiments, the crosslinker includes at least one moiety selected from the group consisting of amine, hydroxyl, isocyanate, a blocked isocyanate, epoxide, carbodiimide, and combinations thereof.

In some embodiments, each of the first solvent and the second solvent is independently selected from the group consisting of water, alcohols, polyols, ethers, esters, ketones, aldehydes, carbonates, lactones, sulfoxides, ionic liquids, and combinations thereof. Exemplary first and second solvents include methyl ethyl ketone, methyl isobutyl ketone, methyl propyl ketone, toluene, and xylenes.

In some embodiments, each of the first additives and the second additives is independently selected from the group consisting of buffers, UV stabilizers, fillers, pigments, flattening agents, flame retardants, salts, surfactants, defoamers, dispersants, wetting agents, antioxidants, adhesion promoters, leveling agents, and combinations thereof.

In some embodiments, an antimicrobial agent is present within the first liquid volume, within the second liquid volume, or within both the first liquid volume and the second liquid volume. In these embodiments, the biphasic polymer to be fabricated from the two-part formula is an antimicrobial biphasic polymer.

When the antimicrobial agent is present, it may be dissolved or suspended in the first solvent. Alternatively, or additionally, the antimicrobial agent may be dissolved or suspended in second solvent. In certain embodiments, the antimicrobial agent may be contained within the first liquid volume but not dissolved in the first solvent. In certain embodiments, the antimicrobial agent may be contained within the second liquid volume but not dissolved in the second solvent. In specific embodiments, the antimicrobial agent may be contained within the first and second liquid volumes but not necessarily dissolved or suspended in either the first solvent or the second solvent.

In some embodiments, there initially is no antimicrobial agent. The antimicrobial agent may be added at a later time, such as right before use of the biphasic polymer as an antimicrobial biphasic polymer. Also, the antimicrobial agent may be replenished at various times during or after use of the antimicrobial biphasic polymer.

In some embodiments, the antimicrobial agent is selected from quaternary ammonium molecules. The quaternary ammonium molecules may be selected from benzalkonium chloride, benzethonium chloride, methylbenzethonium chloride, cetalkonium chloride, cetylpyridinium chloride, cetyl trimethylammonium chloride, alkyltrimethylammonium chloride, tetraethylammonium chloride, didecyldimethylammonium chloride, dodecyl-dimethyl-(2-phenoxyethyl)azanium chloride, bromide versions thereof, or a combination of the foregoing. Other salts of quaternary ammonium may be employed as quaternary ammonium molecules.

In some embodiments, the antimicrobial agent is selected from metal ions. The metal ions are optionally selected from the group consisting of silver, copper, zinc, and combinations thereof.

In some embodiments, the antimicrobial agent is selected from metal oxides. The metal oxides are optionally selected from copper (I) oxide, copper (II) oxide, zinc oxide, silver oxide, and combinations thereof. The metal oxides may be in the form of metal oxide nanoparticles, microparticles, or a combination thereof.

In some embodiments, the antimicrobial agent is selected from acids. The acids are optionally selected from the group consisting of citric acid, acetic acid, peracetic acid, glycolic acid, lactic acid, succinic acid, pyruvic acid, oxalic acid, hydrochloric acid, and combinations thereof.

In some embodiments, the antimicrobial agent is selected from bases. The bases are optionally selected from the group consisting of ammonia, ammonium hydroxide, sodium hydroxide, potassium hydroxide, sodium bicarbonate, potassium bicarbonate, and combinations thereof.

In some embodiments, the antimicrobial agent is selected from salts. The salts are optionally selected from the group consisting of copper chloride, copper nitrate, copper citrate, copper acetate, zinc chloride, zinc nitrate, zinc citrate, zinc acetate, silver chloride, silver nitrate, silver citrate, silver acetate, and combinations thereof.

In some embodiments, the antimicrobial agent is selected from peroxides. The peroxides are optionally selected from the group consisting of hydrogen peroxide, organic peroxides, and combinations thereof.

In some embodiments, the antimicrobial agent is selected from oxidizing molecules. The oxidizing molecules are optionally selected from the group consisting of hypochlorous acid, hydrogen peroxide, sodium hypochlorite, sodium chlorite, sodium chlorate, calcium hypochlorite, calcium chlorite, calcium chlorate, calcium perchlorate, and combinations thereof.

In some embodiments, the antimicrobial agent is selected from N-halamines that are halogenated with chlorine, bromine, iodine, or a combination thereof.

The two-part formula is preferably shelf-stable. By "shelf-stable" it is meant that at room temperature (about 25° C.) and atmospheric pressure (about 1 bar), the two-part formula is capable of being stored for 30 days without substantial chemical reactions spontaneously occurring. Preferably, the two-part formula is capable of being stored at 25° C. and 1 bar for 60 days, and even more preferably at least 90 days, such as at least 120, 150, or 180 days, without substantial chemical reactions spontaneously occurring.

Some variations of the invention provide a multi-part formula for fabricating a biphasic polymer, wherein the multi-part formula comprises:
  (A) a first liquid volume, wherein the first liquid volume comprises:
    (A)(i) a structural phase containing a solid structural polymer;
    (A)(ii) a transport phase containing a solid transport polymer;
    (A)(iii) a chain extender;
    (A)(iv) a curing catalyst;
    (A)(v) a first solvent; and
    (A)(vi) optionally, first additives; and
  (B) a second liquid volume that is volumetrically isolated from the first liquid volume, wherein the second liquid volume comprises:
    (B)(i) a crosslinker that is capable of crosslinking the solid structural polymer with the solid transport polymer;
    (B)(ii) a second solvent; and
    (B)(iii) optionally, second additives.

The multi-part formula may be a two-part formula, a three-part formula, or a four-part formula, for example. In addition to part (A) and part (B), there may be another part, such as a part for additives. In other variations, part (A) is split into sub-parts, which are designed to remain separated from each other as well as from part (B). For example, the structural phase, the transport phase, the chain extender, the curing catalyst, or additives may be included in one or more distinct sub-parts, if desired, within a multi-part formula.

The two-part formula may be contained with a kit. The kit may contain instructions for converting the two-part formula into the biphasic polymer. For example, the instructions may direct a user to make the biphasic polymer by carrying out the following steps:
  (a) start with the two-part formula;
  (b) combine the first liquid volume with the second liquid volume, thereby forming a combined liquid volume; and
  (c) cure the combined liquid volume to react the crosslinker with the solid structural polymer and the solid transport polymer, thereby generating a biphasic polymer.

The instructions in the kit may be printed physical instructions, such as a paper insert in the kit. The instructions may be provided on the Internet, with a link to a web site provided in the kit. The instructions may be provided from a mobile-device app, with download directions provided in the kit. The instructions may be recorded to an audio file that is on a disk or sound card provided in the kit.

Some variations of the invention provide a kit for fabricating a biphasic polymer, wherein the kit comprises:
  (A) a first liquid volume, wherein the first liquid volume comprises:
    (A)(i) a structural phase containing a solid structural polymer;
    (A)(ii) a transport phase containing a solid transport polymer;
    (A)(iii) a chain extender;
    (A)(iv) a curing catalyst;
    (A)(v) a first solvent; and
    (A)(vi) optionally, first additives; and
  (B) a second liquid volume that is volumetrically isolated from the first liquid volume, wherein the second liquid volume comprises:
    (B)(i) a crosslinker that is capable of crosslinking the solid structural polymer with the solid transport polymer;
    (B)(ii) a second solvent; and
    (B)(iii) optionally, second additives; and
  (C) user instructions for converting parts (A) and (B) into a biphasic polymer.

Other variations of the invention provide a method of making a biphasic polymer, the method comprising:
  (a) providing a two-part formula for fabricating a biphasic polymer, wherein the two-part formula consists essentially of:
    (A) a first liquid volume, wherein the first liquid volume comprises:
      (A)(i) a structural phase containing a solid structural polymer;
      (A)(ii) a transport phase containing a solid transport polymer;

(A)(iii) a chain extender;
(A)(iv) a curing catalyst;
(A)(v) a first solvent; and
(A)(vi) optionally, first additives; and
(B) a second liquid volume that is volumetrically isolated from the first liquid volume, wherein the second liquid volume comprises:
(B)(i) a crosslinker that is capable of crosslinking the solid structural polymer with the solid transport polymer;
(B)(ii) a second solvent; and
(B)(iii) optionally, second additives; and
(b) combining the first liquid volume with the second liquid volume, thereby forming a combined liquid volume; and
(c) curing the combined liquid volume to react the crosslinker with the solid structural polymer and the solid transport polymer, thereby generating a biphasic polymer,
wherein the biphasic polymer comprises a discrete solid structural phase comprising the solid structural polymer, wherein the biphasic polymer further comprises a continuous transport phase comprising the solid transport polymer, wherein the solid structural polymer is crosslinked, via the crosslinker, with the solid transport polymer, wherein the continuous transport phase is interspersed within the discrete solid structural phase, and wherein the discrete solid structural phase and the continuous transport phase are separated by an average phase-separation length selected from about 100 nanometers to about 500 microns.

In some methods, the biphasic polymer is formed as a coating on a bulk object made from a different material.

In some methods, the biphasic polymer is formed at a surface of a bulk object. The bulk object itself may be fabricated from the biphasic polymer itself.

In some embodiments, the structural phase (which may also be an anti-fouling phase) is made from solid structural polymers terminated with alcohol and/or amine groups. The solid structural polymers may be selected from non-fluorinated carbon-based polymers including alkanes, polyurethanes, polyureas, or polyesters.

The solid structural polymers may be selected from silicones such as polydimethyl siloxane, polytrifluoropropylmethyl siloxane, aminopropylmethyl siloxane, aminoethylaminopropylmethyl siloxane, or aminoethylaminoisobutylmethyl siloxane.

The solid structural polymers may be selected from fluorinated polymers including fluorinated polyols, perfluorocarbons, perfluoropolyethers, polyfluoroacrylates, polyfluorosiloxanes, polyvinylidene fluoride, or polytrifluoroethylene.

The solid structural polymers may be selected from polycarbonate diols.

The solid structural polymers may be selected from epoxide functional polymers.

In some embodiments, the transport phase is made from solid transport polymers terminated with alcohol and/or amine groups. The solid transport polymers may be selected from hygroscopic polymers, such as poly(acrylic acid), a poly(ethylene glycol), poly(2-hydroxyethyl methacrylate), poly(vinyl imidazole), poly(2-methyl-2-oxazoline), and poly(2-ethyl-2-oxazoline), poly(vinylpyrolidone), or modified cellulosic polymers such as carboxymethyl cellulose, hydroxyethyl cellulose, hydroxypropyl cellulose, or methyl cellulose. In certain embodiments, the solid transport polymers include Carbopol® poly(acrylic acid) that can bind antimicrobial actives.

The solid transport polymers may be selected from hydrophobic but not lipophobic polymers, such as poly(propylene glycol), poly(tetramethylene glycol), polybutadiene, polycarbonate, polycaprolactone, or polyacrylic polyol.

The solid transport polymers may be selected from hydrophilic polymers created with ionic charge. Monomers containing ionic charge, such as pendent carboxylate, amine, sulfate, and phosphate may be inserted along the hydrophilic polymer backbone. The hydrophilic polymers may bind antimicrobial actives.

The solid transport polymers may be selected from electrolyte polymers, such as polyethylene oxide, polypropylene oxide, polycarbonates, or polysiloxanes.

The biphasic polymer may contain chain extenders (difunctional) or crosslinkers (trifunctional or greater functionality) that are alcohol- or amine-terminated. Preferred chain extenders include aromatic diamine species such as Ethacure® 100, Ethacure® 300, and Ethacure® 410. Preferred crosslinkers include multifunctional alcohol species such as trimethylolpropane ethoxylate, trimethyloyl propane, pentaerythritol ethoxylate, or glycerol ethoxylate.

The biphasic polymer also typically contains an isocyanate crosslinker, or a reacted form thereof. Typically, in the two-part formula, the isocyanate crosslinker is contained in Part B. When Parts A and B are combined, the isocyanate crosslinker crosslinks the polymer network to create the biphasic polymer.

Various additives may be introduced to the two-part formula. Additives include, but are not limited to, wetting agents, buffers, UV stabilizers, particulate fillers, flammability suppressants, and antimicrobial actives. Any of these additives may also be added to the biphasic polymer after it is fabricated.

Wetting agents are surfactants that produce a smooth coating surface and aid substrate adhesion. Examples of surfactants include nonionic surfactants, cationic surfactants, anionic surfactants, silicone surfactants, and fluorosurfactants.

Buffers are inorganic or organic molecules that maintain a pH value through acid/base reactions. Buffers can be discrete or bonded to one of the phases of the biphasic polymer.

UV stabilizers may be antioxidants (e.g., thiols), hindered amines (e.g., tetramethylpiperidine derivatives), or UV-absorbing nanoparticles, for example. Examples of UV-absorbing nanoparticles include $TiO_2$, ZnO, CdS, CdTe, ZnS, Ag, or a combination thereof.

Particulate fillers may be selected from silica, alumina, silicates, talc, aluminosilicates, barium sulfate, mica, diatomite, calcium carbonate, calcium sulfate, carbon, wollastonite, or a combination thereof. The particulate filler is optionally surface-modified with a compound selected from the group consisting of fatty acids, silanes, alkylsilanes, fluoroalkylsilanes, silicones, alkyl phosphonates, alkyl phosphonic acids, alkyl carboxylates, alkyldisilazanes, and combinations thereof.

Flammability suppressants are additives that suppress flammability of the biphasic polymer. Exemplary flammability suppressants include ammonium salts, phosphate salts, phosphines, halogenated compounds, carbonate salts, hydroxide salts, borate salts, and high-surface-area silica that inhibits flame propagation. Specific examples of flammability suppressants are ammonium polyphosphate, magnesium hydroxide, zinc hydroxystannate, antimony trioxide, magnesium hydroxycarbonate, zinc borate, magnesium aluminum hydroxycarbonate, aluminum trihydroxide, tetrabromobisphenol A, tetrabromobisphenol A bis (2,3-dibromopropyl ether), bisphenol-A bis(diphenyl phosphate), brominated polyols, melamine resins, and chlorinated paraffin.

Antimicrobial actives may be selected from quaternary ammonium molecules, metal ions (e.g., silver, copper, and/or zinc), metal oxide nanoparticles, acids (e.g., citric acid, acetic acid, peracetic acid, glycolic acid, or hydrochloric acid), bases (e.g., ammonia, potassium hydroxide, sodium hydroxide, or sodium bicarbonate), peroxides (e.g., hydrogen peroxide or organic peroxides such as benzoic peroxide), oxidizing molecules (e.g., such as sodium hypochlorite, hydrogen peroxide, or hypochlorous acid), N-halamines, or a combination thereof. The selected of antimicrobial actives is further discussed later in this specification.

The method may further comprise introducing an antimicrobial agent to the continuous transport phase of the biphasic polymer. The antimicrobial agent may be introduced for the first time, or the antimicrobial agent may be replenished after a period of time.

Some embodiments utilize a method of filling or replenishing an antimicrobial agent in the biphasic polymer, the method comprising:
(a) selecting an antimicrobial agent;
(b) providing a biphasic polymer that is designed to contain the antimicrobial agent;
(c) optionally measuring a concentration of the antimicrobial agent within the biphasic polymer;
(d) providing a replenishment solution comprising a quantity of the antimicrobial agent and an antimicrobial-agent solvent;
(e) applying the replenishment solution to the biphasic polymer; and
(f) removing excess replenishment solution, if any, from the biphasic polymer, thereby generating an antimicrobial-agent-replenished biphasic polymer.

In some embodiments, the antimicrobial agent is contained in the first liquid volume (Part A) of the two-part formula. In other embodiments, the antimicrobial agent is contained in the second liquid volume (Part B) of the two-part formula. In still other embodiments, the same antimicrobial agent is contained in the first and second liquid volumes of the two-part formula. In yet other embodiments, a first antimicrobial agent is contained in the first liquid volume, and a second antimicrobial agent is contained in the second liquid volume. In certain embodiments, a first antimicrobial agent precursor is contained in the first liquid volume, and a second antimicrobial agent precursor is contained in the second liquid volume; when the liquid volumes are combined, the first and second precursors react to form a selected antimicrobial agent.

In other embodiments, no antimicrobial agent is contained in two-part formula. An antimicrobial agent may be introduced, such as via wiping or spraying, into the biphasic polymer after it is formed from the two-part formula.

Some variations provide an antimicrobial structure comprising:
(a) a discrete solid structural phase comprising a solid structural polymer, wherein the solid structural polymer is characterized by a glass-transition temperature from about 20° C. to about 300° C.;
(b) a continuous transport phase that is interspersed within the discrete solid structural phase, wherein the continuous transport phase comprises a solid transport material; and
(c) an antimicrobial agent contained within the continuous transport phase, wherein the antimicrobial agent is at least partially dissolved in a fluid and/or wherein the antimicrobial agent is in a solid solution with the continuous transport phase,
wherein the discrete solid structural phase and the continuous transport phase are separated by an average phase-separation length selected from about 100 nanometers to about 500 microns.

The concentration of antimicrobial agent in the biphasic polymer may be from about 1 ppm to about 10 wt % (based on all components present), depending on the specific antimicrobial agent and/or other factors. In various embodiments, the concentration of antimicrobial agent in the biphasic polymer is about, at least about, or at most about 1 ppm, 10 ppm, 25 ppm, 50 ppm, 100 ppm, 200 ppm, 300 ppm, 400 ppm, 500 ppm, 0.1 wt %, 0.2 wt %, 0.5 wt %, 1 wt %, 2 wt %, 5 wt %, or 10 wt %, including any intervening ranges.

The biphasic polymer may be a polymer described in U.S. Pat. No. 10,689,542, issued on Jun. 23, 2020; U.S. Pat. No. 11,225,589, issued on Jan. 18, 2022; and/or U.S. Pat. No. 11,369,109, issued on Jun. 28, 2022, each of which is hereby incorporated by reference herein for all purposes.

In some embodiments, the discrete solid structural phase is covalently bonded to the continuous transport phase. In certain embodiments, the discrete solid structural phase is crosslinked, via a crosslinking molecule, with the continuous transport phase.

In some embodiments, the solid structural polymer is a non-fluorinated carbon-based polymer. The non-fluorinated carbon-based polymer may be selected from the group consisting of polycarbonates, polyacrylates, polyalkanes, polyurethanes, polyethers, polyureas, polyesters, and combinations thereof. In some preferred embodiments, the solid structural polymer is a polycarbonate, a polyacrylate, or a combination thereof.

In certain embodiments, the solid structural polymer is a polycarbonate, such as a polycarbonate that is end-terminated with hydroxyl groups (—OH), amino groups (—NH$_2$), and/or epoxide groups (—O—).

In certain embodiments, the solid structural polymer is a polyacrylate, such as a polyacrylate functionalized with alkanes, alkenes, and/or aromatic groups.

The continuous transport phase may include a hygroscopic solid transport polymer as a solid transport material. The solid transport material may be a hygroscopic solid transport polymer selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), modified cellulosic polymers, carboxymethyl cellulose, hydroxyethyl cellulose, hydroxypropyl cellulose, methyl cellulose, and combinations thereof, for example.

The continuous transport phase may include a hydrophobic, non-lipophobic solid transport polymer. The solid transport material may be a hydrophobic, non-lipophobic solid transport polymer selected from the group consisting of poly(propylene glycol), poly(tetramethylene glycol), polybutadiene (or other unsaturated polyolefins), polycarbonate, polycaprolactone, acrylic polyols, and combinations thereof, for example.

The continuous transport phase may include a hydrophilic solid transport polymer with ionic charge. The solid transport material may be a hydrophilic solid transport polymer with ionic charge, wherein the ionic charge is optionally present within the hydrophilic solid transport polymer as carboxylate groups, amine groups, ammonium groups, sulfate groups, or phosphate groups, for example.

The continuous transport phase may include an electrolyte solid transport polymer. The solid transport material may be an electrolyte solid transport polymer selected from the group consisting of polyethylene oxide, polypropylene oxide, polycarbonates, polysiloxanes, polyvinylidene difluoride, and combinations thereof, for example.

In some embodiments, the continuous transport phase contains a fluid, wherein the antimicrobial agent is at least partially dissolved in the fluid. The fluid may be selected from the group consisting of water, alcohols, polyols, ketones, ethers, esters, carbonates, sulfoxides, ionic liquids, and combinations thereof, for example. Exemplary fluids are water, dialkyl carbonate, propylene carbonate, γ-butyrolactone, 2-phenoxyethanol, dimethyl sulfoxide, t-butanol, glycerol, propylene glycol, and ionic liquids.

In some embodiments, a solid transport material is a solid transport polymer. The solid structural polymer may be crosslinked, via a crosslinking molecule, with the solid transport polymer. The crosslinking molecule may include at least one moiety selected from the group consisting of amine, hydroxyl, isocyanate, epoxide, carbodiimide, and combinations thereof, for example. Exemplary isocyanates include Vestanat® 1890 and Desmodur® 3300.

The crosslinking molecule may also function as a chain extender. Alternatively, or additionally, a separate chain extender may be used.

In some embodiments, a crosslinker or chain extender is selected from polyol or polyamine crosslinkers or chain extenders that possess a functionality of 2, 3, or greater. In various embodiments, polyol or polyamine crosslinkers or chain extenders are selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol propoxylate, ethylenediamine, 1,3-propanediamine, 1,4-butanediamine, diethyltoluenediamine, dimethylthiotoluenediamine, isophoronediamine, diaminocyclohexane, N,N,N',N'-tetrakis(2-hydroxypropyl)ethylenediamine, and homologues, derivatives, or combinations thereof.

The average phase-separation length, between the discrete solid structural phase and the continuous transport phase, may vary widely. In some embodiments, the average phase-separation length is selected from about 100 nanometers to about 100 microns. In some embodiments, the average phase-separation length is selected from about 200 nanometers to about 50 microns. In some embodiments, the average phase-separation length is selected from about 1 micron to about 100 microns. In some embodiments, the average phase-separation length is selected from about 1 micron to about 50 microns. In various embodiments, the average phase-separation length is selected from about, at least about, or at most about 100 nm, 125 nm, 150 nm, 175 nm, 200 nm, 250 nm, 300 nm, 400 nm, 500 nm, 600 nm, 700 nm, 800 nm, 900 nm, 1 µm, 2 µm, 3 µm, 4 µm, 5 µm, 6 µm, 7 µm, 8 µm, 9 µm, 10 µm, 15 µm, 20 µm, 25 µm, 30 µm, 35 µm, 40 µm, 45 µm, 50 µm, 60 µm, 70 µm, 80 µm, 90 µm, 100 µm, 150 µm, 200 µm, 250 µm, 300 µm, 350 µm, 400 µm, 450 µm, or 500 µm, including any intervening ranges (e.g., 150 nm-5 µm, 500 nm-45 µm, etc.). There may be narrow or broad distribution of phase-separation lengths. Exemplary imaging techniques to measure phase separation include, but are not limited to, confocal laser scanning microscopy, scanning electron microscopy, scanning tunneling microscopy, and atomic force microscopy.

In some methods, the biphasic polymer is transparent or partially transparent for optical frequencies of ordinary light. Transparent, antimicrobial biphasic polymers are useful because they do not change the appearance of underlying substrates being coated (e.g., a door handle). The biphasic polymer may be characterized by an optical transparency of about 80% or greater. In various embodiments, the optical transparency of the biphasic polymer is about, or at least about, 50%, 55%, 60%, 65%, 70%, 75%, 80%, 85%, 90%, 95%, or 99%, for example. In this disclosure, the optical transparency of a biphasic polymer is the light transmittance, averaged across light wavelengths from 400 nm to 800 nm, through a 100-micron film of the antimicrobial structure at 25° C. and 1 bar. When the biphasic polymer has a transparency less than 50%, the biphasic polymer may be characterized as translucent.

The optical transparency of the biphasic polymer is a function of the optical transparency, the nature, and extent of individual components—the structural phase, the transport phase, the antimicrobial agent, and any other additives. In some embodiments, each component is at least partially transparent. Antimicrobial agent liquids or solutions are typically clear. When one component is relatively opaque, the overall antimicrobial structure may still have an acceptable transparency, depending on the amount of the relatively opaque component, for example.

In certain embodiments, different phases of the biphasic polymer are selected such that the respective refraction indices are matched or substantially similar. One example is polytetrahydrofuran with poly(ethylene glycol), which are index-matched to within about 1%. Another example is polytetrahydrofuran with poly(propylene glycol), which are index-matched to within 2%. Another example is polycarbonate with poly(ethylene glycol), which are index-matched to within 10%. In some embodiments, a continuous transport phase and a discrete solid structural phase are selected such that the index of refraction matches to within ±10%, preferably within ±5%, more preferably with ±2%, and most preferably with ±1%. Note, however, that refractive-index matching is not a requirement of the present invention.

The optical transparency of the biphasic polymer may temporarily deviate from its initial value when dirt or debris contaminate the surface, before the surface is wiped or cleaned. Antifouling biphasic polymers are beneficial to avoid permanent decrease in optical transparency in the case of non-cleanable fouling, for example.

In some embodiments, a biphasic-polymer coating is stain-resistant due to the presence of fluorinated polymers or additives. Fluorinated materials have low surface energies which reduce the penetration of liquid contaminants, thereby enhancing stain resistance.

In some embodiments, a biphasic-polymer coating is stain-resistant without the use of fluorinated polymers or additives. The stain resistance arises from the incorporation of materials with a glass-transition temperature above room temperature, instead of requiring fluorinated materials to avoid soil infiltration.

In some embodiments, a discrete solid structural phase provides mechanical integrity and anti-fouling characteristics (stain resistance). The continuous transport phase acts as a medium for the fast diffusion of antimicrobial agents.

Preferred variations utilize polymeric coatings that are solid but have fast transport rates of antimicrobial agents, enabled by a two-phase architecture with a discrete solid structural phase combined with an antimicrobial-containing continuous transport phase that is phase-separated with the discrete solid structural phase.

In this patent application, "fast transport" means a specific conductivity of at least $10^{-5}$ mS/cm. "Antimicrobial agents" or synonymously "antimicrobial actives" include germicides, bactericides, virucides (antivirals), antifungals, antiprotozoals, antiparasites, and biocides. In some embodiments, antimicrobial agents are specifically bactericides, such as disinfectants, antiseptics, and/or antibiotics. In some embodiments, antimicrobial agents are specifically virucides, or include virucides.

Some embodiments overcome the conventional trade-off between antifouling and fluorinated material content. Fluorinated materials are usually employed in order to reject stains and fluids. By contrast, in some embodiments, a biphasic polymer incorporates a solid structural polymer having a glass-transition temperature above the use temperature. The crystallized nature of the solid structural polymer being below its $T_g$ results in the material not being penetrated by stains. A second phase, which is a continuous transport phase, enables removal of stains on the surface, in these embodiments.

In certain embodiments, the entire biphasic polymer is non-fluorinated, i.e., contains essentially no fluorine. In these embodiments, there is no fluorine content in the two-part formula.

Some embodiments overcome the conventional trade-off between transport of absorbed molecules and transparency. Phase separation of 0.1-500 μm results in up to 1000× faster diffusion compared to nanoscale (<100 nm) phase separation. Fast transport of antimicrobial agents is retained without creating an optically opaque antimicrobial structure.

In some embodiments, the antimicrobial agent is selected from quaternary ammonium molecules, such as (but not limited to) benzalkonium chloride, benzethonium chloride, methylbenzethonium chloride, cetalkonium chloride, or combinations thereof.

In some embodiments, the antimicrobial agent is selected from metal ions, such as (but not limited to) silver, copper, zinc, or combinations thereof.

In some embodiments, the antimicrobial agent is selected from metal oxide nanoparticles, containing a metal oxide such as (but not limited to) ZnO, CuO, $Cu_2O$, $Ag_2O$, or a combination thereof.

In some embodiments, the antimicrobial agent is selected from acids, such as (but not limited to) citric acid, acetic acid, peracetic acid, glycolic acid, lactic acid, succinic acid, pyruvic acid, oxalic acid, hydrochloric acid, or combinations thereof.

In some embodiments, the antimicrobial agent is selected from bases, such as (but not limited to) ammonia, ammonium hydroxide, sodium hydroxide, potassium hydroxide, sodium bicarbonate, potassium bicarbonate, or combinations thereof.

In some embodiments, the antimicrobial agent is selected from salts, such as (but not limited to) copper chloride, copper nitrate, copper citrate, copper acetate, zinc chloride, zinc nitrate, zinc citrate, zinc acetate, silver chloride, silver nitrate, silver citrate, silver acetate, or combinations thereof.

In some embodiments, the antimicrobial agent is selected from peroxides, such as (but not limited to) hydrogen peroxide, organic peroxides (e.g., benzoic peroxide), or combinations thereof.

In some embodiments, the antimicrobial agent is selected from oxidizing molecules, such as (but not limited to) sodium hypochlorite, calcium hypochlorite, hypochlorous acid, hydrogen peroxide, or combinations thereof.

The antimicrobial agent preferably is not in the form of purely solid particles. In preferred embodiments, the antimicrobial agent is not in the form of solid particles at temperatures of use (e.g., 20-40° C.). Quaternary ammonium salts are deliquescent and will advantageously form a concentrated solution that does not dry out. Quaternary ammonium salts may absorb moisture from the air or may be dissolved in a solvent, such as ethylene glycol or oligomers thereof. Hypochlorous acid, sodium hypochlorite, calcium hypochlorite, and hydrogen peroxide only exist as solutions or liquids, practically speaking. Hypochlorous acid and sodium hypochlorite are never found dry because they decompose with increasing concentration before they dry out. Hydrogen peroxide is a liquid above −0.4° C. at 1 bar pressure.

The antimicrobial agent may be at least partially dissolved in a fluid that is contained within the continuous transport phase. The fluid may be selected from the group consisting of water, dialkyl carbonate, propylene carbonate, γ-butyrolactone, 2-phenoxyethanol, dimethyl sulfoxide, t-butanol, glycerol, propylene glycol, ionic liquids, and combinations thereof, for example.

In some embodiments, the biphasic polymer is characterized in that the antimicrobial agent has a diffusion coefficient from about $10^{-18}$ m$^2$/s to about $10^{-9}$ m$^2$/s, measured at 25° C. and 1 bar, within the continuous transport phase. In certain embodiments, the antimicrobial agent has a diffusion coefficient from about $10^{-16}$ m$^2$/s to about $10^{-11}$ m$^2$/s measured at 25° C. and 1 bar, within the continuous transport phase. In various embodiments, the antimicrobial agent has a diffusion coefficient, measured at 25° C. and 1 bar, within the continuous transport phase, of about, or at least about $10^{-17}$ m$^2$/s, $10^{-16}$ m$^2$/s, $10^{-15}$ m$^2$/s, $10^{-14}$ m$^2$/s, $10^{-13}$ m$^2$/s, $10^{-12}$ m$^2$/s, $10^{-11}$ m$^2$/s, $10^{-10}$ m$^2$/s, or $10^{-9}$ m$^2$/s, including any intervening ranges.

The biphasic polymer may further contain one or more additives selected from the group consisting of buffers, UV stabilizers, fillers, pigments, flattening agents, flame retardants, salts, surfactants, dispersants, defoamers, wetting agents, antioxidants, and combinations thereof, for example. Other additives are possible as well.

Additional variations of the present disclosure will now be described, without limiting the scope of the invention defined by the claims.

The disclosed biphasic polymer is capable of resolving the technical tradeoffs between antimicrobial solutions and solid surfaces. Conventional liquid solutions are fast but not persistent. Liquid solutions can reduce the population of bacteria and viruses on a timescale of minutes, but the liquid solutions do not stay on surfaces and have a one-time effect. Conventional solid antimicrobial surfaces reduce bacteria and virus populations quite slowly, causing bacteria and virus to remain on surfaces for extended times. See Behzadinasab et al., "A Surface Coating that Rapidly Inactivates SARS-CoV-2", ACS Appl. Mater. Interfaces 2020, 12, 31, as an example of an antimicrobial coating that requires at least 1 hour for effectiveness. The slow activity of conventional solid antimicrobial materials is due to the time needed for antimicrobial agents to diffuse to the surface. These surfaces also fail to work if they are dirty, because soil blocks the transport of antimicrobial agents to the surface.

By contrast, a biphasic polymer can break the tradeoff between activity and persistence. The discrete solid structural phase provides persistence on a surface while the continuous transport phase allows antimicrobial agents to move to microbes (e.g., viruses or bacteria) on the surface at order-of-magnitude faster rates than is possible with diffusion through a single solid material. A biphasic structure simultaneously provides durability and fast transport to the surface where antimicrobial agents can kill or deactivate microbes at the surface. The continuous transport phase may contain an aqueous or non-aqueous solvent or electrolyte to further enhance transport rates of antimicrobial agents. In some embodiments, the continuous transport phase passively absorbs water from the environment, which water may enhance transport rates of antimicrobial agents and/or improve the effectiveness of the antimicrobial agents.

In preferred biphasic polymers, the solid structural polymer is covalently bonded to the solid transport polymer. In preferred embodiments, a solid structural polymer is crosslinked, via a crosslinking molecule, with a solid transport polymer. The crosslinking is preferably covalent crosslinking, but can alternatively be ionic crosslinking. When the discrete and continuous phases are covalently crosslinked, an abrasion-resistant structure is established within the continuous transport phase. Additionally, when the structural polymer and the transport polymer are crosslinked, the length scales of the different phases can be controlled, such as to enhance transport rates of the antimicrobial agent.

A crosslinking molecule (when present) may include at least one moiety selected from the group consisting of an amine moiety, a hydroxyl moiety, an isocyanate moiety, and a combination thereof, for example. Other crosslinking molecules may be employed. In certain embodiments, at least one moiety is an isocyanate moiety, which may be a blocked isocyanate.

In some embodiments, the continuous transport phase is a solid solution or solid suspension of the solid transport material and the antimicrobial agent. For example, when the antimicrobial agent is a liquid, the continuous transport phase may be a solution of the solid transport material and the antimicrobial agent. When the antimicrobial agent is a solid, the continuous transport phase may be a suspension of the solid transport material and the antimicrobial agent. In certain embodiments, the solid transport material and the antimicrobial agent form a true solid solution, which means that each material is dissolved in the other material such that a single solid phase results.

In other embodiments, the continuous transport phase contains a transport-phase liquid that at least partially dissolves the antimicrobial agent. The transport-phase liquid may be selected from the group consisting of water, dialkyl carbonate, propylene carbonate, γ-butyrolactone, 2-phenoxyethanol, and combinations thereof.

Alternatively, or additionally, the transport-phase liquid is selected from polar solvents. Polar solvents may be protic polar solvents or aprotic polar solvents. Exemplary polar solvents include, but are not limited to, water, alcohols, ethers, esters, ketones, aldehydes, carbonates, and combinations thereof. In some embodiments, the transport-phase liquid is water that is passively incorporated from atmospheric humidity.

Alternatively, or additionally, the transport-phase liquid is selected from ionic liquids. Exemplary ionic liquids include, but are not limited to, ammonium-based ionic liquids synthesized from substituted quaternary ammonium salts.

In some embodiments, the antimicrobial agent is selected from quaternary ammonium molecules (whether or not classified as an ionic liquid). Exemplary quaternary ammonium molecules include, but are not limited to, benzalkonium chloride, benzethonium chloride, methylbenzethonium chloride, cetalkonium chloride, cetylpyridinium chloride, cetrimonium, cetrimide, tetraethylammonium bromide, didecyldimethylammonium chloride, dioctyldimethylammonium chloride, and domiphen bromide. Quaternary ammonium molecules or eutectic mixtures of quaternary ammonium molecules that are liquids at room temperature—ionic liquids or ionic liquid eutectics, respectively—enable liquid-state rates of transport with negligible vapor pressure. A specific example is tetrabutylammonium heptadecafluorooctanesulfonate ($C_{24}H_{36}F_{17}NO_3S$), which has a melting point <5° C. Another specific example is tetraoctylammonium chloride ($C_{32}H_{68}ClN$) with a melting point of 50-54° C. mixed with tetraheptylammonium chloride ($C_{28}H_{60}ClN$) with a melting point of 38-41° C. in a eutectic composition ratio that forms a liquid at room temperature (25° C.). Quaternary ammonium molecules may be mixed with imidazolium-based ionic liquids, pyridinium-based ionic liquids, pyrrolidinium-based ionic liquids, and/or phosphonium-based ionic liquids.

In certain embodiments, the transport-phase liquid contains one or more water-soluble salts, one or more of which may function as an antimicrobial agent. Exemplary water-soluble salts include, but are not limited to, copper chloride, copper nitrate, zinc chloride, zinc nitrate, silver chloride, silver nitrate, or combinations thereof. Other exemplary water-soluble salts include quaternary ammonium salts, such as (but not limited to) the quaternary ammonium molecules recited above.

In certain embodiments, the transport-phase liquid is a eutectic liquid salt, which is optionally derived from ammonium salts. The eutectic liquid salt may contain an antimicrobial agent or otherwise be antimicrobially active.

In some embodiments, the antimicrobial agent is selected from oxidizing molecules, such as (but not limited to) those selected from the group consisting of sodium hypochlorite, calcium hypochlorite, hypochlorous acid, hydrogen peroxide, and combinations thereof.

In some embodiments, the antimicrobial agent is selected from metal ions, such as (but not limited to) silver, copper, zinc, cobalt, nickel, or combinations thereof. Any metal ion with at least some antimicrobial activity itself, or which confers antimicrobial activity to a compound which the metal ion binds to, may be employed. The metal ion may be present in a metal complex or a metal salt, for example. Metal ions may be present in oxides. In certain embodiments, the antimicrobial agent contains a neutral metal (e.g., zero-valent silver, copper, or zinc) which may be dissolved in a liquid and/or may be present as nanoparticles, for example.

The antimicrobial biphasic polymer disclosed herein is not limited to transport of antimicrobial agent exclusively by pure diffusion. Depending on the specific choice of materials, antimicrobial agent, and method of using the structure, the actual transport may occur by various mass-transfer mechanisms including, but not limited to, Fickian diffusion, non-Fickian diffusion permeation, sorption transport, solubility-diffusion, charge-driven flow, convection, capillary-driven flow, and so on. As just one example, when the antimicrobial biphasic polymer is employed in an automobile, the polymer can move around quickly in space such that the antimicrobial agent undergoes some amount of centrifugal convection.

Even when the mass transport is dominated by diffusion, the actual transport rate (flux) of antimicrobial agent through the structure depends not only on the diffusion coefficient, but also on the three-dimensional concentration gradient, temperature, and possibly other factors such as pH. In various embodiments, the actual flux of antimicrobial agent through the structure is about, or at least about, 2×, 3×, 4×, 5×, 10×, 20×, 30×, 40×, 50×, 100×, 200×, 300×, 400×, 500×, or 1000× higher than the flux through a solid-state material. A person of ordinary skill in the art can calculate or estimate transport fluxes for a given structure geometry and materials, or carry out experiments to determine such fluxes.

The antimicrobial biphasic polymer may be characterized by an original concentration of antimicrobial agent (prior to exposure to microbes). The original concentration of antimicrobial agent may be selected based on the type of antimicrobial agent, and intended use of the antimicrobial biphasic polymer, and/or other factors. In various embodiments, the original concentration of antimicrobial agent is about, at least about, or at most about 0.00001 wt %, 0.0001 wt %, 0.001 wt %, 0.01 wt %, 0.1 wt %, 1 wt %, 5 wt %, 10 wt %, 20 wt %, 30 wt %, 40 wt %, or 50 wt %, on the basis of mass of antimicrobial agent divided by total mass of all components within 0.1%, 1%, 5%, or 10% depth from the surface into the bulk structure.

An electrolyte may be included in the continuous transport phase, to increase transport rates of the antimicrobial agent.

An exemplary electrolyte is a complex formed between poly(ethylene oxide) and metal salts, such as poly(ethylene oxide)-$Cu(CF_3SO_3)_2$ which is a known copper conductor. $Cu(CF_3SO_3)_2$ is the copper(II) salt of trifluoromethanesulfonic acid. See Bonino et al., "Electrochemical properties of copper-based polymer electrolytes", *Electrochimica Acta*, Vol. 37, No. 9, Pages 1711-1713 (1992), which is incorporated by reference.

When an electrolyte is included in the continuous transport phase, one or more solvents for the electrolyte may be present. Solvents for the electrolyte may be selected from the group consisting of sulfoxide, sulfolane, ethylene carbonate, propylene carbonate, dimethyl carbonate, diethyl carbonate, methyl ethyl carbonate, 1,2-dimethoxyethane, 1,2-diethoxyethane, γ-buterolactone, γ-valerolactone, 1,3-dioxolane, tetrahydrofuran, 2-methyltetrahydrofuran, acetonitrile, proprionitrile, diglyme, triglyme, methyl formate, trimethyl phosphate, triethyl phosphate, and mixtures thereof, for example.

When an electrolyte is included in the continuous transport phase, there may be a salt within an aqueous or non-aqueous solvent. Exemplary salts are salts of transition metals (e.g., V, Ti, Cr, Co, Ni, Cu, Zn, Tb, W, Ag, Cd, or Au), salts of metalloids (e.g., Al, Ga, Ge, As, Se, Sn, Sb, Te, or Bi), salts of alkali metals (e.g., Li, Na, or K), salts of alkaline earth metals (e.g., Mg or Ca), or a combination thereof.

In some embodiments, a gel electrolyte is included in the continuous transport phase. A gel electrolyte contains a liquid electrolyte including an aqueous or non-aqueous solvent as well as a salt, in a polymer host. The solvent and salt may be selected from the lists above. The polymer host may be selected from the group consisting of poly(ethylene oxide), poly(vinylidene fluoride), poly(acrylonitrile), poly (methyl methacrylate), poly(vinylidene fluoride—hexafluoropropylene) (PVdF-co-HFP), polycarbonate, polysiloxane, and combinations thereof.

N-halamines may be incorporated into the backbone of the biphasic polymer, in the structural phase, the transport phase, or both phases. N-halamines are compounds that stabilize an oxidizing agent (such as chlorine contained within the N-halamine molecule) and may be used to kill or deactivate microbes. N-halamines remain stable over long time periods and may be recharged by exposure to an oxidizer such as dilute bleach or ozone. Exemplary N-halamines include, but are not limited to, hydantoin (imidazolidine-2,4-dione); 1,3-dichloro-5,5-dimethylhydantoin; 3-bromo-1-chloro-5,5-dimethylhydantoin; 5,5-dimethylhydantoin; 4,4-dimethyl-2-oxazalidinone; tetramethyl-2-imidazolidinone; and 2,2,5,5-tetramethylimidazo-lidin-4-one. Examples of antimicrobial N-halamines are also disclosed in Lauten et al., *Applied and Environmental Microbiology* Vol. 58, No. 4, Pages 1240-1243 (1992), which is incorporated by reference.

In certain embodiments, the antimicrobial structure further contains one or more layers of an antimicrobial-agent storage phase that is distinct from the continuous transport phase and the discrete solid structural phase. In these or other certain embodiments, the antimicrobial structure further contains inclusions of an antimicrobial-agent storage phase that is distinct from the continuous transport phase and the discrete solid structural phase. An antimicrobial-agent storage phase may be fabricated from the same material as the solid transport material, or from a different material. For example, both the solid transport material and the antimicrobial-agent storage phase (when present) may be made from a hydrophobic, non-lipophobic polymer. The antimicrobial-agent storage phase may contain an antimicrobial agent that is released initially, continuously, or periodically into the continuous transport phase.

The antimicrobial structure may further contain one or more additives, such as (but not limited to) salts, buffers, UV stabilizers, particulate fillers, pigments, flattening agents, surfactants, dispersants, flame retardants, or combinations thereof. Additives, when present, may be incorporated into the discrete solid structural phase, the continuous transport phase, both of these phases, or neither of these phases but within a separate phase.

When an additive is a salt, there will be a cation and anion forming the salt. The cation element may be Li, Na, K, Mg, and/or Ca, for example. The anion element or group may be F, Cl, Br, I, $SO_3$, $SO_4$, $NO_2$, $NO_3$, $CH_3COO$, and/or $CO_3$, for example.

When an additive is a buffer, it may be an inorganic or organic molecule that maintains a pH value or pH range via acid-base reactions. A buffer may be discrete or may be bonded to the solid transport material, for example.

When an additive is a UV stabilizer, it may be an antioxidant (e.g., a thiol), a hindered amine (e.g., a derivative of tetramethylpiperidine), UV-absorbing nanoparticles (e.g., $TiO_2$, ZnO, CdS, CdTe, or ZnS—Ag nanoparticles), or a combination thereof, for example.

When an additive is a particulate filler, it may be selected from the group consisting of silica, alumina, silicates, talc, aluminosilicates, barium sulfate, mica, diatomite, calcium carbonate, calcium sulfate, carbon, wollastonite, and a combination thereof, for example. A particulate filler is optionally surface-modified with a compound selected from the group consisting of fatty acids, silanes, alkylsilanes, fluoroalkylsilanes, silicones, alkyl phosphonates, alkyl phosphonic acids, alkyl carboxylates, alkyldisilazanes, and combinations thereof, for example.

When an additive is a pigment, it may be selected from the group consisting of metal-complex pigments, azo pigments, polycyclic pigments, and anthraquinone pigments. Metal-oxide pigments include titanium dioxide, cobalt oxide, and iron oxide, for example.

When an additive is a flame retardant for the suppression of flammability (e.g., to inhibit flame propagation), the flame retardant may be selected from the group consisting of ammonium salts, phosphate salts, phosphines, halogenated compounds, carbonate salts, hydroxide salts, borate salts, high-surface-area silicas, expandable graphite, and combinations thereof. Specific examples of flame retardants are ammonium polyphosphate, magnesium hydroxide, zinc hydroxystannate, antimony trioxide, magnesium hydroxycarbonate, zinc borate, magnesium aluminum hydroxycarbonate, aluminum trihydroxide, tetrabromobisphenol A, tetrabromobisphenol A bis(2,3-dibromopropyl ether), bisphenol-A bis(diphenyl phosphate), brominated polyols, melamine resins, chlorinated paraffins, and combinations thereof.

Some embodiments will now be further described in reference to exemplary synthesis of a discrete solid structural phase and a continuous transport phase, a preferred biphasic architecture, and selective incorporation of an antimicrobial agent within the continuous transport phase.

Some embodiments are premised on the preferential incorporation of an antimicrobial agent within one phase of a multiphase polymer coating. The structure of a microphase-separated polymer network provides a reservoir for antimicrobial agents within the continuous phase.

As intended herein, "microphase-separated" means that the first and second solid materials (e.g., soft segments) are physically separated on a microphase-separation length scale from about 0.1 microns to about 500 microns.

Unless otherwise indicated, all references to "phases" in this patent application are in reference to solid phases or fluid phases. A "phase" is a region of space (forming a thermodynamic system), throughout which all physical properties of a material are essentially uniform. Examples of physical properties include density and chemical composition. A solid phase is a region of solid material that is chemically uniform and physically distinct from other regions of solid material (or any liquid or vapor materials that may be present). Solid phases are typically polymeric and may melt or at least undergo a glass transition at elevated temperatures. Reference to multiple solid phases in a composition or microstructure means that there are at least two distinct material phases that are solid, without forming a solid solution or homogeneous mixture.

In some embodiments, the antimicrobial agent is in a fluid. Preferably, the fluid is not solely in a vapor phase at 25° C., since vapor is susceptible to leaking from the structure. However, the fluid may contain vapor in equilibrium with liquid, at 25° C. Also, in certain embodiments, a fluid is in liquid form at 25° C. but at least partially in vapor form at a higher use temperature, such as 30° C., 40° C., 50° C., or higher.

By a liquid being "disposed in" a solid material, it is meant that the liquid is incorporated into the bulk phase of the solid material, and/or onto surfaces of particles of the solid material. The liquid will be in close physical proximity with the solid material, intimately and/or adjacently. The disposition is meant to include various mechanisms of chemical or physical incorporation, including but not limited to, chemical or physical absorption, chemical or physical adsorption, chemical bonding, ion exchange, or reactive inclusion (which may convert at least some of the liquid into another component or a different phase, including potentially a solid). Also, a liquid disposed in a solid material may or may not be in thermodynamic equilibrium with the local composition or the environment. Liquids may or may not be permanently contained in the structure; for example, depending on volatility or other factors, some liquid may be lost to the environment over time.

By "selectively" disposed in the continuous transport phase, or the "selectivity" into the continuous transport phase, it is meant that the antimicrobial agent that is disposed within the structure overall, at least 51%, preferably at least 75%, and more preferably at least 90% of the antimicrobial agent is disposed in only the continuous transport phase. In various embodiments, the selectivity into the continuous transport phase is about, or at least about, 60%, 65%, 70%, 75%, 80%, 85%, 90%, 95%, 99%, or 100%.

In some embodiments, a liquid is added to a polymer such as by submerging and soaking into the polymer. In these embodiments, the liquid may be absorbed into a solid polymer. In certain embodiments, the liquid absorption swells a polymer, which means that there is an increase of volume of polymer due to absorption of the liquid. The liquid may be, but does not need to be, classified as a solvent for the solid polymer which it swells.

The phase-separated microstructure preferably includes discrete islands of one material (the discrete solid structural phase) within a continuous sea of the other material (the continuous transport phase). The continuous phase provides unbroken channels within the material for transport of mass and/or electrical charge.

In some embodiments, there are both phase-separated inclusions of the same chemical material, as well as physically and chemically distinct materials as additional inclusions.

The discrete solid structural phase and the continuous transport phase may be present as phase-separated regions of a copolymer, such as a block copolymer. As intended herein, a "block copolymer" means a copolymer containing a linear arrangement of blocks, where each block is defined as a portion of a polymer molecule in which the monomeric units have at least one constitutional or configurational feature absent from the adjacent portions. Segmented block copolymers are preferred, providing two (or more) phases. An exemplary segmented copolymer is a urethane-urea copolymer. In some embodiments, a segmented polyurethane includes a microphase-separated structure of fluorinated and non-fluorinated species.

In some embodiments, a segmented copolymer is employed in which first soft segments form a continuous matrix and second soft segments are a plurality of discrete inclusions. In other embodiments, the first soft segments are a plurality of discrete inclusions and the second soft segments form a continuous matrix.

Segmented copolymers are typically created by combining a flexible oligomeric soft segment terminated with an alcohol or amine reactive groups and a multifunctional isocyanate. When the isocyanate is provided in excess relative to the alcohol/amine reactive groups, a viscous prepolymer mixture with a known chain length distribution is formed. This can then be cured to a high-molecular-weight network through the addition of amine or alcohol reactive groups to bring the ratio of isocyanate to amine/alcohol groups to unity. The product of this reaction is a chain backbone with alternating segments: soft segments of flexible oligomers and hard segments of the reaction product of low-molecular-weight isocyanates and alcohol/amines.

Due to the chemical immiscibility of these two phases, the material typically phase-separates on the length scale of these individual molecular blocks, thereby creating a microstructure of flexible regions adjacent to rigid segments strongly associated through hydrogen bonding of the urethane/urea moieties. This combination of flexible and associated elements typically produces a physically crosslinked elastomeric material.

Some variations of the invention utilize a segmented copolymer composition comprising:
(a) one or more first soft segments selected from fluoropolymers having an average molecular weight from about 500 g/mol to about 20,000 g/mol, wherein the fluoropolymers are $(\alpha,\omega)$-hydroxyl-terminated, $(\alpha,\omega)$-amine-terminated, and/or $(\alpha,\omega)$-thiol-terminated;
(b) one or more second soft segments selected from polyesters or polyethers, wherein the polyesters or polyethers are $(\alpha,\omega)$-hydroxyl-terminated, $(\alpha,\omega)$-amine-terminated, and/or $(\alpha,\omega)$-thiol-terminated;
(c) one or more isocyanate species possessing an isocyanate functionality of 2 or greater, or a reacted form thereof; and
(d) one or more polyol or polyamine chain extenders or crosslinkers, or a reacted form thereof,
wherein the first soft segments and the second soft segments may (in some embodiments) be microphase-separated on a microphase-separation length scale from about 0.1 microns to about 500 microns, and
optionally wherein the molar ratio of the second soft segments to the first soft segments is less than 2.0.

In some embodiments, fluoropolymers are present in the triblock structure:

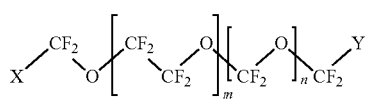

wherein:
X, Y=CH$_2$—(O—CH$_2$—CH$_2$)$_p$-T, and X and Y are independently selected;
p=1 to 50;
T is a hydroxyl, amine, or thiol terminal group;
m=0 to 100 (in some embodiments, m=1 to 100); and
n=0 to 100 (in some embodiments, n=1 to 100).

Some variations of the invention utilize a segmented copolymer composition comprising:
(a) one or more first soft segments selected from polycarbonates having an average molecular weight from about 500 g/mol to about 20,000 g/mol, wherein the polycarbonates are $(\alpha,\omega)$-hydroxyl-terminated, $(\alpha,\omega)$-amine-terminated, and/or $(\alpha,\omega)$-thiol-terminated;
(b) one or more second soft segments selected from polyesters or polyethers, wherein the polyesters or polyethers are $(\alpha,\omega)$-hydroxyl-terminated, $(\alpha,\omega)$-amine-terminated, and/or $(\alpha,\omega)$-thiol-terminated;
(c) one or more isocyanate species possessing an isocyanate functionality of 2 or greater, or a reacted form thereof; and
(d) one or more polyol or polyamine chain extenders or crosslinkers, or a reacted form thereof,
wherein the first soft segments and the second soft segments may (in some embodiments) be microphase-separated on a microphase-separation length scale from about 0.1 microns to about 500 microns.

In some embodiments, the continuous transport phase includes a polyelectrolyte and a counterion to the polyelectrolyte. The polyelectrolyte may be selected from the group consisting of poly(acrylic acid) or copolymers thereof, cellulose-based polymers, carboxymethyl cellulose, chitosan, poly(styrene sulfonate) or copolymers thereof, poly(acrylic acid) or copolymers thereof, poly(methacrylic acid) or copolymers thereof, poly(allylamine), and combinations thereof, for example. The counterion may be selected from the group consisting of H$^+$, Li$^+$, Na$^+$, K$^+$, Ag$^+$, Ca$^{2+}$, Mg$^{2+}$, La$^{3+}$, C$_{16}$N$^+$, F$^-$, Cl$^-$, Br$^-$, I$^-$, BF$_4^-$, So$_4^{2-}$, PO$_4^{2-}$, C$_{12}$SO$_3^-$, and combinations thereof, for example.

Other ionic species, combined with counterions, may be employed as well in the continuous transport phase. Generally, in some embodiments, ionic species may be selected from the group consisting of an ionizable salt, an ionizable molecule, a zwitterionic component, a polyelectrolyte, an ionomer, and combinations thereof.

An "ionomer" is a polymer composed of ionomer molecules. An "ionomer molecule" is a macromolecule in which a significant (e.g., greater than 1, 2, 5, 10, 15, 20, or 25 mol %) proportion of the constitutional units have ionizable or ionic groups, or both.

The classification of a polymer as an ionomer versus polyelectrolyte depends on the level of substitution of ionic groups as well as how the ionic groups are incorporated into the polymer structure. For example, polyelectrolytes also have ionic groups covalently bonded to the polymer backbone, but have a higher ionic group molar substitution level (such as greater than 50 mol %, usually greater than 80 mol %). Polyelectrolytes are polymers whose repeating units bear an electrolyte group. Polyelectrolyte properties are thus similar to both electrolytes (salts) and polymers. Like salts, their solutions are electrically conductive. Like polymers, their solutions are often viscous.

In some embodiments, the continuous transport phase includes a polymer such as a polyurethane, a polyurea, a polysiloxane, or a combination thereof, with at least some charge along the polymer backbone. Polymer charge may be achieved through the incorporation of ionic monomers such as dimethylolpropionic acid, or another ionic species. The degree of polymer charge may vary, such as about, or at least about, 1, 2, 5, 10, 15, 20, or 25 mol % of the polymer repeat units being ionic repeat units.

In some embodiments, the continuous transport phase includes an ionic species selected from the group consisting of (2,2-bis-(1-(1-methyl imidazolium)-methylpropane-1,3-diol bromide), 1,2-bis(2'-hydroxyethyl)imidazolium bromide, (3-hydroxy-2-(hydroxymethyl)-2-methylpropyl)-3-methyl-1H-3λ$^4$-imidazol-1-ium bromide, 2,2-bis(hydroxymethyl)butyric acid, N,N-bis(2-hydroxyethyl)-2-aminoethanesulfonic acid, N-methyl-2,2'-iminodiethanol, 3-dimethylamino-1,2-propanediol, 2,2-bis(hydroxymethyl) propionic acid, 1,4-bis(2-hydroxyethyl)piperazine, 2,6-diaminocaproic acid, N,N-bis(2-hydroxyethyl)glycine, 2-hydroxypropanoic acid hemicalcium salt, dimethylolpropionic acid, N-methyldiethanolamine, N-ethyldiethanolamine, N-propyldiethanolamine, N-benzyldiethanolamine, N-t-butyldiethanolamine, bis(2-hydroxyethyl) benzylamine, bis(2-hydroxypropyl) aniline, and homologues, combinations, derivatives, or reaction products thereof.

A liquid may be introduced into the continuous transport phase actively, passively, or a combination thereof. In some embodiments, a liquid is actively introduced to the continuous transport phase by spraying of the liquid, deposition from a vapor phase derived from the liquid, liquid injection, bath immersion, or other techniques. In some embodiments, a liquid is passively introduced to the continuous transport phase by letting the liquid naturally be extracted from the normal atmosphere, or from a local atmosphere adjusted to contain one or more desired liquids in vapor or droplet (e.g., mist) form.

In certain embodiments, a desired additive is normally a solid at room temperature and is first dissolved or suspended in a liquid that is then disposed in the continuous transport phase.

In other certain embodiments, a desired additive is normally a solid at room temperature and is first melted to produce a liquid that is then disposed in the continuous transport phase. Within the continuous transport phase, the desired additive may partially or completely solidify back to a solid, or may form a multiphase material, for example.

Some potential additives contain reactive groups that unintentionally react with chemical groups contained in the polymer precursors. Therefore, in some cases, there exists an incompatibility of liquid species in the resin during chemical synthesis and polymerization. Addition of reactive fluid additives into the reaction mixture during synthesis can dramatically alter stoichiometry and backbone structure, while modifying physical and mechanical properties. One strategy to circumvent this problem is to block the reactive groups (e.g., alcohols, amines, and/or thiols) in the fluid additive with chemical protecting groups to render them inert to reaction with other reactive chemical groups (e.g., isocyanates) in the coating precursors.

In particular, it is possible to temporarily block a reactive position by transforming it into a new functional group that will not interfere with the desired transformation. That blocking group is conventionally called a "protecting group." Incorporating a protecting group into a synthesis requires at least two chemical reactions. The first reaction transforms the interfering functional group into a different one that will not compete with (or compete at a lower reaction rate with) the desired reaction. This step is called protection. The second chemical step transforms the protecting group back into the original group at a later stage of synthesis. This latter step is called deprotection.

In some embodiments in which an additive contains alcohol, amine, and/or thiol groups, the additive thus contains chemical protecting groups to prevent or inhibit reaction of the alcohol, amine, and/or thiol groups with isocyanates. The protecting groups may be designed to undergo deprotection upon reaction with atmospheric moisture, for example.

In the case of an additive containing alcohol groups, the protecting groups may be selected from the silyl ether class of alcohol protecting groups. For example, the protecting groups may be selected from the group consisting of trimethylsilyl ether, isopropyldimethylsilyl ether, tert-butyldimethylsilyl ether, tert-butyldiphenylsilyl ether, tribenzylsilyl ether, triisopropylsilyl ether, and combinations thereof. In these or other embodiments, the protecting groups to protect alcohol may be selected from the group consisting of 2,2,2-trichloroethyl carbonate, 2-methoxyethoxymethyl ether, 2-naphthylmethyl ether, 4-methoxybenzyl ether, acetate, benzoate, benzyl ether, benzyloxymethyl acetal, ethoxyethyl acetal, methoxymethyl acetal, methoxypropyl acetal, methyl ether, tetrahydropyranyl acetal, triethylsilyl ether, and combinations thereof.

In the case of an additive containing amine groups, the protecting groups may be selected from the carbamate class of amine protecting groups, such as (but not limited to) vinyl carbamate. Alternatively, or additionally, the protecting groups may be selected from the ketamine class of amine protecting groups. In these or other embodiments, the protecting groups to protect amine may be selected from the group consisting of 1-chloroethyl carbamate, 4-methoxybenzenesulfonamide, acetamide, benzylamine, benzyloxy carbamate, formamide, methyl carbamate, trifluoroacetamide, tert-butoxy carbamate, and combinations thereof.

In the case of an additive containing thiol groups, the protecting groups may be selected from S-2,4-dinitrophenyl thioether and/or S-2-nitro-1-phenylethyl thioether, for example.

The typical reaction mechanism when water is the deprotecting reagent is simple hydrolysis. Water is often nucleophilic enough to kick off a leaving group and deprotect a species. One example of this is the protection of an amine with a ketone to form a ketamine. These can be mixed with isocyanates when the amine alone would react so quickly as to not be able to be practically mixed. Instead the ketamine reagent is inert but after mixing and casting as a film, atmospheric moisture will diffuse into the coating, remove the ketone (which vaporizes itself) and leaves the amine to rapidly react with neighboring isocyanates in situ.

Many deprotecting agents require high pH, low pH, or redox chemistry to work. However, some protecting groups are labile enough that water alone is sufficient to cause deprotection. When possible, a preferred strategy to spontaneously deprotect the molecules is through reaction with atmospheric moisture, such as an atmosphere containing from about 10% to about 90% relative humidity at ambient temperature and pressure. A well-known example is the room-temperature vulcanization of silicones. These systems have silyl ethers that are deprotected with moisture and in doing so the free Si—OH reacts with other silyl ethers to create Si—O—Si covalent bonds, forming a network.

In other embodiments, a chemical deprotection step is actively conducted, such as by introducing a deprotection agent and/or adjusting mixture conditions such as temperature, pressure, pH, solvents, electromagnetic field, or other parameters.

This specification hereby incorporates by reference herein Greene and Wuts, *Protective Groups in Organic Synthesis*, Fourth Edition, John Wiley & Sons, New York, 2007, for its teachings of the role of protecting groups, synthesis of protecting groups, and deprotection schemes including for example adjustment of pH by addition of acids or bases, to cause deprotection.

As intended in this patent application, "hygroscopic" means that a material is capable of attracting and holding water molecules from the surrounding environment. The water uptake of various polymers is described in Thijs et al., "Water uptake of hydrophilic polymers determined by a thermal gravimetric analyzer with a controlled humidity chamber" *J. Mater. Chem.*, (17) 2007, 4864-4871, which is hereby incorporated by reference herein. In some embodiments, a hygroscopic material is characterized by a water absorption capacity, at 90% relative humidity and 30° C., of at least 5, 10, 15, 20, 25, 30, 35, 40, 45, or 50 wt % uptake of $H_2O$.

In some embodiments employing segmented copolymers, one of the first soft segments and second soft segments is oleophobic. An oleophobic material has a poor affinity for oils. As intended herein, the term "oleophobic" means a material with a contact angle of hexadecane greater than 90°. An oleophobic material may also be classified as lipophobic.

In some embodiments employing segmented copolymers, one of the first soft segments and the second soft segments may be a "low-surface-energy polymer" which means a polymer, or a polymer-containing material, with a surface energy of no greater than 50 mJ/m². In some embodiments, one of the first soft segments and the second soft segments has a surface energy from about 5 mJ/m² to about 50 mJ/m².

In some embodiments employing segmented copolymers, the first soft segments or the second soft segments may be or include a fluoropolymer, such as (but not limited to) a fluoropolymer selected from the group consisting of polyfluoroethers, perfluoropolyethers, fluoroacrylates, fluorosilicones, polytetrafluoroethylene (PTFE), polyvinylidene difluoride (PVDF), polyvinylfluoride (PVF), polychlorotrifluoroethylene (PCTFE), copolymers of ethylene and trifluoroethylene, copolymers of ethylene and chlorotrifluoroethylene, and combinations thereof.

In these or other embodiments, the first soft segments or the second soft segments may be or include a siloxane. A siloxane contains at least one Si—O—Si linkage. The siloxane may consist of polymerized siloxanes or polysiloxanes (also known as silicones). One example is polydimethylsiloxane.

In some embodiments, the molar ratio of the second soft segments to the first soft segments is about 2.0 or less. In various embodiments, the molar ratio of the second soft segments to the first soft segments is about 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 1.95.

It is noted that $(\alpha,\omega)$-terminated polymers are terminated at each end of the polymer. The $\alpha$-termination may be the same or different than the $\omega$-termination on the opposite end. The fluoropolymers and/or the polyesters or polyethers may terminated with a combination of hydroxyl groups, amine groups, and thiol groups, among other possible termination groups. Note that thiols can react with an —NCO group (usually catalyzed by tertiary amines) to generate a thiourethane.

Also it is noted that in this disclosure, "$(\alpha,\omega)$-termination" includes branching at the ends, so that the number of terminations may be greater than 2 per polymer molecule. The polymers herein may be linear or branched, and there may be various terminations and functional groups within the polymer chain, besides the end $(\alpha,\omega)$ terminations.

In this description, "polyurethane" is a polymer comprising a chain of organic units joined by carbamate (urethane) links, where "urethane" refers to N(H)—(C=O)—O—. Polyurethanes are generally produced by reacting an isocyanate containing two or more isocyanate groups per molecule with one or more polyols containing on average two or more hydroxyl groups per molecule, in the presence of a catalyst.

Polyols are polymers with on average two or more hydroxyl groups per molecule. For example, a,w-hydroxyl-terminated perfluoropolyether is a type of polyol.

"Isocyanate" is the functional group with the formula —N=C=O. For the purposes of this disclosure, O—C(=O)—N(H)—R is considered a derivative of isocyanate. "Isocyanate functionality" refers to the number of isocyanate reactive sites on a molecule. For example, diisocyanates have two isocyanate reactive sites and therefore an isocyanate functionality of 2. Triisocyanates have three isocyanate reactive sites and therefore an isocyanate functionality of 3.

"Polyfluoroether" refers to a class of polymers that contain an ether group—an oxygen atom connected to two alkyl or aryl groups, where at least one hydrogen atom is replaced by a fluorine atom in an alkyl or aryl group.

"Perfluoropolyether" (PFPE) is a highly fluorinated subset of polyfluoroethers, wherein all hydrogen atoms are replaced by fluorine atoms in the alkyl or aryl groups.

"Polyurea" is a polymer comprising a chain of organic units joined by urea links, where "urea" refers to N(H)—(C=O)—N(H)—. Polyureas are generally produced by reacting an isocyanate containing two or more isocyanate groups per molecule with one or more multifunctional amines (e.g., diamines) containing on average two or more amine groups per molecule, optionally in the presence of a catalyst.

A "chain extender or crosslinker" is a compound (or mixture of compounds) that link long molecules together and thereby complete a polymer reaction. Chain extenders or crosslinkers are also known as curing agents, curatives, or hardeners. In polyurethane/urea systems, a curative is typically comprised of hydroxyl-terminated or amine-terminated compounds which react with isocyanate groups present in the mixture. Diols as curatives form urethane linkages, while diamines as curatives form urea linkages. The choice of chain extender or crosslinker may be determined by end groups present on a given prepolymer. In the case of isocyanate end groups, curing can be accomplished through chain extension using multifunctional amines or alcohols, for example. Chain extenders or crosslinkers can have an average functionality greater than 2 (such as 2.5, 3.0, or greater), i.e. beyond diols or diamines.

In some embodiments, polyesters or polyethers are selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

In some embodiments, the isocyanate species is selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis (phenyl isocyanate), isophorone diisocyanate, and combinations or derivatives thereof.

The polyol or polyamine chain extender or crosslinker possesses a functionality of 2 or greater, in some embodiments. At least one polyol or polyamine chain extender or crosslinker may be selected from the group consisting of 1,4-butanediol, 1,3-propanediol, 1,2-ethanediol, glycerol, trimethylolpropane, ethylenediamine, isophoronediamine, diaminocyclohexane, and homologues, derivatives, or combinations thereof. In some embodiments, polymeric forms of polyol chain extenders or crosslinkers are utilized, typically hydrocarbon or acrylic backbones with hydroxyl groups distributed along the side groups.

The one or more chain extenders or crosslinkers (or reaction products thereof) may be present in a concentration, in the segmented copolymer composition, from about 0.01 wt % to about 25 wt %, such as from about 0.05 wt % to about 10 wt %.

First soft segments may be present in a concentration from about 5 wt % to about 95 wt % based on total weight of the composition. In various embodiments, the first soft segments may be present in a concentration of about 5, 10, 20, 30, 40, 50, 60, 70, 80, 90, or 95 wt % based on total weight of the composition. Second soft segments may be present in a concentration from about 5 wt % to about 95 wt % based on total weight of the composition. In various embodiments, the second soft segments may be present in a concentration of about 5, 10, 20, 30, 40, 50, 60, 70, 80, 90, or 95 wt % based on total weight of the composition.

In some embodiments, fluorinated polyurethane oligomers are terminated with silane groups. The end groups on the oligomers (in the prepolymer) may be modified from isocyanate to silyl ethers. This can be accomplished through reaction of an isocyanate-reactive silane species (e.g., aminopropyltriethoxysilane) to provide hydrolysable groups well-known in silicon and siloxane chemistry. Such an approach eliminates the need for addition of a stoichiometric amount of curative to form strongly associative hard segments, while replacing the curative with species that possess the ability to form a covalently crosslinked network under the influence of moisture or heat. Such chemistry has been shown to preserve beneficial aspects of urethane coatings while boosting scratch resistance.

In addition, the reactivity of the terminal silane groups allows for additional functionality in the form of complimentary silanes blended with the prepolymer mixture. The silanes are able to condense into the hydrolysable network upon curing. This strategy allows for discrete domains of distinct composition. A specific embodiment relevant to anti-fouling involves the combination of fluoro-containing urethane prepolymer that is endcapped by silane reactive groups with additional alkyl silanes.

In some embodiments employing segmented copolymers, the microphase-separated microstructure containing the first and second soft segments may be characterized as an inhomogeneous microstructure. As intended in this patent application, "phase inhomogeneity," "inhomogeneous microstructure," and the like mean that a multiphase microstructure is present in which there are at least two discrete phases that are separated from each other. The two phases may be one discrete solid structural phase in a continuous solid phase, two co-continuous solid phases, or two discrete solid structural phases in a third continuous solid phase, for example. In some embodiments, the length scale of phase inhomogeneity refers to the average size (e.g., effective diameter) of discrete inclusions of one phase dispersed in a continuous phase. In some embodiments, the length scale of phase inhomogeneity refers to the average center-to-center distance between nearest-neighbor inclusions of the same phase.

The average length scale of phase inhomogeneity (which may also be referred to as an average phase-separation length) may generally be from about 0.1 microns to about 500 microns. In some embodiments, the average length scale of phase inhomogeneity is from about 0.5 microns to about 100 microns, such as about 1 micron to about 50 microns. In various embodiments, the average length scale of phase inhomogeneity is about 0.1, 0.2, 0.3, 0.4, 0.5, 0.6, 0.7, 0.8, 0.9, 1, 2, 3, 4, 5, 10, 15, 20, 25, 30, 35, 40, 45, 50, 60, 70, 80, 90, 100, 150, 200, 250, 300, 350, 400, 450, or 500 microns, including any intermediate values not explicitly recited, and ranges starting, ending, or encompassing such intermediate values. These are average values, noting that a portion of phase inhomogeneity may be present on a length scale less than 0.1 micron or greater than 500 microns (e.g., about 1000 microns), with the overall average falling in the range of 0.1-500 microns. Note that in this disclosure, "about 0.1 microns" is intended to encompass 0.05-0.149 microns (50-149 nanometers), i.e. ordinary rounding.

The antimicrobial structure may also be characterized by hierarchical phase separation. For example, when segmented copolymers are utilized, first soft segments and second soft segments—in addition to being microphase-separated—are typically nanophase-separated. As intended herein, two materials being "nanophase-separated" means that the two materials are separated from each other on a length scale from about 1 nanometer to about 100 nanometers. For example, the nanophase-separation length scale may be from about 10 nanometers to about 100 nanometers.

The nanophase separation between first solid material (or phase) and second solid material (or phase) may be caused by the presence of a third solid material (or phase) disposed between regions of the first and second solid materials. For example, in the case of first and second solid materials being soft segments of a segmented copolymer also with hard segments, the nanophase separation may be driven by intermolecular association of hydrogen-bonded, dense hard segments. In these cases, in some embodiments, the first soft segments and the hard segments are nanophase-separated on an average nanophase-separation length scale from about 10 nanometers to less than 100 nanometers. Alternatively, or additionally, the second soft segments and the hard segments may be nanophase-separated on an average nanophase-separation length scale from about 10 nanometers to less than 100 nanometers. The first and second soft segments themselves may also be nanophase-separated on an average nanophase-separation length scale from about 10 nanometers to less than 100 nanometers, i.e., the length scale of the individual polymer molecules.

The nanophase-separation length scale is hierarchically distinct from the microphase-separation length scale. With traditional phase separation in block copolymers, the blocks chemically segregate at the molecular level, resulting in regions of segregation on the length scale of the molecules, such as a nanophase-separation length scale from about 10 nanometers to about 100 nanometers. See Petrovic et al., "POLYURETHANE ELASTOMERS" *Prog. Polym. Sci.*, Vol. 16, 695-836, 1991. The extreme difference of the two soft segments means that in the reaction pot the soft segments do not mix homogeneously and so create discrete region that are rich in fluoropolymer or rich in non-fluoropolymer (e.g., PEG) components, distinct from the molecular-level segregation. These emulsion droplets contain a large amount of polymer chains and are thus in the micron length-scale range. These length scales survive the curing process, so that the final material contains the microphase separation that was set-up from the emulsion, in addition to the molecular-level (nanoscale) segregation.

In some embodiments, therefore, the larger length scale of separation (0.1-500 microns) is driven by an emulsion process, which provides microphase separation that is in addition to classic molecular-level phase separation. Chen et al., "Structure and morphology of segmented polyurethanes: 2. Influence of reactant incompatibility" *POLYMER*, 1983, Vol. 24, pages 1333-1340, is hereby incorporated by reference herein for its teachings about microphase separation that can arise from an emulsion-based procedure.

In some embodiments, discrete inclusions have an average size (e.g., effective diameter) from about 50 nm to about 150 μm, such as from about 100 nm to about 100 μm. In various embodiments, discrete inclusions have an average size (e.g., effective diameter) of about 50 nm, 100 nm, 200 nm, 500 nm, 1 μm, 2 μm, 5 μm, 10 μm, 50 μm, 100 μm, or 200 μm.

In these or other embodiments, discrete inclusions (of discrete solid structural phase) have an average center-to-center spacing between adjacent inclusions, through a continuous matrix (of continuous transport phase), from about 50 nm to about 150 μm, such as from about 100 nm to about 100 μm. In various embodiments, discrete inclusions have an average center-to-center spacing between adjacent inclusions of about 50 nm, 100 nm, 200 nm, 500 nm, 1 μm, 2 μm, 5 μm, 10 μm, 50 μm, 100 μm, or 200 μm.

In some variations of the invention, the antimicrobial structure forms a coating disposed on a substrate. The coating may have a thickness from about 1 μm to about 10 mm, for example. In various embodiments, the coating thickness is about, at least about, or at most about 100 nm, 1 μm, 10 μm, 100 μm, 1 mm, or 10 mm, including any intervening ranges. Thicker coatings provide the benefit that even after surface abrasion, the coating still functions because the entire depth of the coating (not just the outer surface) contains the functional materials. The coating thickness will generally depend on the specific application. Note that the definition of optical transparency in this disclosure, which averages the transparency across light wavelengths from 400 nm to 800 nm through a 100-micron film of the antimicrobial structure at 25° C. and 1 bar, does not mean that the coating thickness must be 100 μm.

An optional substrate may be disposed on the back side of the antimicrobial structure. A substrate will be present when the material forms a coating or a portion of a coating (e.g., one layer of a multilayer coating). Many substrates are possible, such as a metal, polymer, wood, or glass substrate. Essentially, the substrate may be any material or object for which antimicrobial protection is desirable.

In some embodiments, an adhesion layer is disposed on a substrate, wherein the adhesion layer is configured to promote adhesion of the antimicrobial structure to the selected substrate. An adhesion layer contains one or more adhesion-promoting materials, such as (but not limited to) primers (e.g., carboxylated styrene-butadiene polymers), alkoxysilanes, zirconates, and titanium alkoxides.

Various strategies are possible to form the materials of the biphasic polymer, as will be appreciated by a skilled artisan.

In some embodiments, the biphasic polymer is made in the form of an applique that may be adhered to a surface at the point of use.

The two-part formula may be solventborne or waterborne. When the two-part formula is solventborne, the first and second solvents are both organic solvents or inorganic solvents other than water. When the two-part formula is waterborne, the first and second solvents are both aqueous solvents, such as water or a solution containing water. In certain embodiments, one of the first or second solvents contains water, while the other solvent does not contain water.

In some waterborne embodiments, first or second soft segments may be derived from an aqueous dispersion of a linear crosslinkable polyurethane containing charged groups, and the other soft segments may be derived from a crosslinking agent containing charged groups, for example.

In some embodiments, a precursor includes a silane, a silyl ether, a silanol, an alcohol, or a combination or reaction product thereof, and optionally further includes a protecting group that protects the precursor from reacting with other components.

Some embodiments employ waterborne polyurethane dispersions. A successful waterborne polyurethane dispersion sometimes requires the specific components to contain ionic groups to aid in stabilizing the emulsion. Other factors contributing to the formulation of a stable dispersion include the concentration of ionic groups, concentration of water or solvent, and rate of water addition and mixing during the inversion process. An isocyanate prepolymer may be dispersed in water. Subsequently, a curative component may be dispersed in water. Water evaporation then promotes the formation of a microphase-separated polyurethane material.

A composition or precursor composition may generally be formed from a precursor material (or combination of materials) that may be provided, obtained, or fabricated from starting components. The precursor material is capable of hardening or curing in some fashion, to form a precursor composition containing the first soft segments and second soft segments, microphase-separated on a microphase-separation length scale from about 0.1 microns to about 500 microns. The precursor material may be a liquid; a multiphase liquid; a multiphase slurry, emulsion, or suspension; a gel; or a dissolved solid (in solvent), for example.

In some embodiments, an emulsion sets up in the reaction mixture based on incompatibility between the two blocks (e.g., PEG and PC). The emulsion provides microphase separation in the precursor material. The precursor material is then cured from casting or spraying. The microphase separation survives the curing process (even if the length scales change somewhat during curing), providing the benefits in the final materials (or precursor compositions) as described herein. The microphase separation in this invention is not associated with molecular length-scale separation (5-50 nm) that many classic block-copolymer systems exhibit. Rather, the larger length scales of microphase separation, i.e. 0.1-500 μm, arise from the emulsion that was set-up prior to curing.

Xu et al., "Structure and morphology of segmented polyurethanes: 1. Influence of incompatibility on hard-segment sequence length" *POLYMER*, 1983, Vol. 24, pages 1327-1332 and Chen et al., "Structure and morphology of segmented polyurethanes: 2. Influence of reactant incompatibility" *POLYMER*, 1983, Vol. 24, pages 1333-1340, are each hereby incorporated by reference herein for their teachings about emulsion set-up in polyurethane systems prior to curing.

In some variations of the invention, a precursor material is applied to a substrate and allowed to react, cure, or harden to form a final composition (e.g., coating). In some embodiments, a precursor material is prepared and then dispensed (deposited) over an area of interest. Any known methods to deposit precursor materials may be employed. A fluid precursor material allows for convenient dispensing using spray coating or casting techniques.

The fluid precursor material may be applied to a surface using any coating technique, such as (but not limited to) spray coating, dip coating, doctor-blade coating, air knife coating, curtain coating, single and multilayer slide coating, gap coating, knife-over-roll coating, metering rod (Meyer bar) coating, reverse roll coating, rotary screen coating, extrusion coating, casting, or printing. Because relatively simple coating processes may be employed, rather than lithography or vacuum-based techniques, the fluid precursor material may be rapidly sprayed or cast in thin layers over large areas (such as multiple square meters).

When a solvent or carrier fluid is present in a fluid precursor material, the solvent or carrier fluid may include one or more compounds selected from the group consisting of water, alcohols (such as methanol, ethanol, isopropanol, or tert-butanol), ketones (such as acetone, methyl ethyl ketone, or methyl isobutyl ketone), hydrocarbons (e.g., toluene), acetates (such as tert-butyl acetate), acids (such as organic acids), bases, and any mixtures thereof. When a solvent or carrier fluid is present, it may be in a concentration of from about 10 wt % to about 99 wt % or higher, for example.

The precursor material may be converted to an intermediate material or the final composition using any one or more of curing or other chemical reactions, or separations such as removal of solvent or carrier fluid, monomer, water, or vapor. Curing refers to toughening or hardening of a polymeric material by physical crosslinking, covalent crosslinking, and/or covalent bonding of polymer chains, assisted by electromagnetic waves, electron beams, heat, and/or chemical additives. Chemical removal may be accomplished by heating/flashing, vacuum extraction, solvent extraction, centrifugation, etc. Physical transformations may also be involved to transfer precursor material into a mold, for example. Additives may be introduced during the hardening

EXAMPLES

Materials.

Polyethylene glycol ($M_n$=600 g/mol, referred to as PEG 600), pentaerythritol propoxylate (5/4 PO/OH ratio), 2-butanone, and dibutyltin dilaurate ($C_{32}H_{64}O_4Sn$, catalyst) are obtained from MilliporeSigma (Darmstadt, Germany). 2-Butanone is dried over sieves prior to use. CPX 2012 is obtained from TRiiSO LLC (Del Mar, California, USA). Ethacure 100-LC is obtained from Albemarle. Desmodur N3300A (aliphatic polyisocyanate, HDI trimer) is obtained from Covestro (Leverkusen, Germany). BYK-054 (defoamer) is obtained from BYK (Wesel, Germany). Zeffle GK-570 (butyl acetate solution of a copolymer of tetrafluoroethylene and hydrocarbon olefins with pendant OH groups) is obtained from Daikin (Changshu, Jiangsu, China). DisperByk 2008 (acrylic copolymer) is obtained from ALTANA (Wesel, Germany). Acematt 3300 (silica) is obtained from Evonik (Essen, Germany). Declam (The Boeing Company, Chicago, Illinois, USA) is a laminate with a poly(vinyl fluoride) top surface, used as a substrate for coatings.

Example 1A: Preparation of Part A of Amine-Cured System

PEG 600 (10.00 g) is added to a mixer cup. CPX 2012 (polycarbonate precursor, 20.54 g) is melted at 70° C. and added to the mixer cup. The solution is centrifugally mixed for one minute at 2000 revolutions per minute (RPM). The mixer cup is placed in an oven and heated to 70° C. The cup is removed from the oven followed by the addition of 2-butanone (45.16 g), Ethacure 100-LC (4.84 g), and dibutyltin dilaurate (0.24 g, 4000 ppm). The solution is mixed for two minutes at 2000 RPM. The resultant solution is homogenous and mostly clear with a light yellow tint. The solution is poured into a glass jar, an inert gas layer is added, and the container is sealed tightly. This forms Part A of the two-part formula for an amine-curable system.

Example 1B: Preparation of Part B of Amine-Cured System

2-Butanone (45.16 g) and Desmodur N3300A (24.83 g) are added to a mixer cup and centrifugally mixed for two minutes at 2000 RPM. The resultant solution is homogenous and clear. The solution is poured into a glass jar, an inert gas layer is added, and the container is sealed tightly. This forms Part B of the two-part formula for an amine-curable system.

Example 1C: Spray Coating of Amine-Cured System

Part A (Example 1A, 8.00 g) and Part B (Example 1B, 6.96 g) are combined in a mixer cup and centrifugally mixed at 2000 RPM for one minute. The resultant solution is added to a spray gun (Anest Iwata LPH-80) and sprayed onto a substrate containing areas of both aluminum and Declam. Five coats are applied in total.

The substrate is placed into an oven and allowed to cure for four hours at 60° C., forming an amine-cured biphasic polymer from the two-part formula. The biphasic polymer coating is approximately 2.5 mils thick (about 64 microns).

Example 1D: Aging and Spray Coating of Amine-Cured System

Part A (Example 1A, 8.00 g) and Part B (Example 1B, 6.96 g) are each aged for 23 days. Following this aging, Part A and Part B are then combined in a mixer cup and centrifugally mixed at 2000 RPM for one minute. The resultant solution is immediately added to a spray gun (Anest Iwata LPH-80) and sprayed onto a substrate containing Declam. Five coats are applied in total.

The substrate is placed into an oven and allowed to cure for four hours at 60° C., forming an amine-cured biphasic polymer from the two-part formula. The biphasic polymer coating is approximately 2.5 mils thick (about 64 microns).

Example 2A: Preparation of Part A of Alcohol-Cured System

PEG 600 (10.00 g) is added to a mixer cup. CPX 2012 (polycarbonate precursor, 20.54 g) is melted at 70° C. and added to the mixer cup. The solution is centrifugally mixed for one minute at 2000 RPM. The cup is placed in an oven and heated to 70° C. The cup is removed from the oven followed by the addition of 2-butanone (45.19 g), pentaerythritol propoxylate (5.47 g), BYK-054 (0.12 g), and dibutyltin dilaurate (0.24 g, 4000 ppm). The solution is mixed for four minutes at 2000 RPM. The resultant solution is homogenous and clear. The solution is poured into a glass jar, an inert gas layer is added, and the container is sealed tightly. This forms Part A of the two-part formula for an alcohol-curable system.

Example 2B: Preparation of Part B of Alcohol-Cured System

2-Butanone (45.19 g) and Desmodur N3300A (24.25 g) are added to a mixer cup and centrifugally mixed for two minutes at 2000 RPM. The resultant solution is homogenous and clear. The solution is poured into a glass jar, an inert gas layer is added, and the container is sealed tightly. This forms Part B of the two-part formula for an alcohol-curable system.

Example 2C: Spray Coating of Alcohol-Cured System

Part A (Example 2A, 8.00 g) and Part B (Example 2B, 6.84 g) are added to a mixer cup and centrifugally mixed at 2000 RPM for one minute. The resultant solution is added to a spray gun (Anest Iwata LPH-80) and sprayed onto a substrate containing areas of both aluminum and Declam. Five coats are applied in total.

The substrate is placed into an oven and allowed to cure for four hours at 60° C., forming an alcohol-cured biphasic polymer from the two-part formula. The biphasic polymer coating is approximately 2.5 mils thick (about 64 microns).

Example 2D: Aging and Spray Coating of Alcohol-Cured System

Part A (Example 2A, 8.00 g) and Part B (Example 2B, 6.84 g) are each aged for 11 days. Following this aging, Part A and Part B are then combined in a mixer cup and centrifugally mixed at 2000 RPM for one minute. The process, if desired, to adjust pH, stability, density, viscosity, color, or other properties, for functional, ornamental, safety, or other reasons.

resultant solution is added to a spray gun (Anest Iwata LPH-80) and sprayed onto a substrate containing Declam. Five coats are applied in total.

The substrate is placed into an oven and allowed to cure for four hours at 60° C., forming an alcohol-cured biphasic polymer from the two-part formula. The biphasic polymer coating is approximately 2.5 mils thick (about 64 microns).

Example 3A: Preparation of Part A of Alcohol-Cured Mixed Fluorinated and Non-Fluorinated System PEG 600 (4.50 g), Zeffle GK-570 (2.06 g), and pentaerythritol propoxylate (2.56 g) are added to a mixer cup. CPX 2012 (polycarbonate precursor, 7.89 g) is melted at 70° C. and added to the mixer cup. The solution is centrifugally mixed for one minute at 2000 RPM. The cup is placed in an oven and heated to 70° C. The cup is removed from the oven followed by the addition of 2-butanone (6.78 g). The solution is mixed for two minutes at 2000 RPM. Dibutyltin dilaurate (0.11 g), BYK-054 (0.05 g), DisperByk 2008 (0.27 g), and Bardac 208M (0.81 g) (quaternary ammonium compounds, as antimicrobial agent) are added to the mixer cup. This solution is mixed for 1 minute at 2000 RPM. Acematt 3300 (2.44 g) is added to the mixer cup and the solution is mixed for two minutes at 2000 RPM. Butyl acetate (13.47 g) is added to the mixer cup and the solution is mixed for one minute at 2000 RPM. The resultant solution is homogenous and opaque. The solution is poured into a glass jar, an inert gas layer is added, and the container is sealed tightly. This forms Part A of the two-part formula for an alcohol-curable mixed fluorinated and non-fluorinated system.

Example 3B: Preparation of Part B of Alcohol-Cured Mixed Fluorinated and Non-Fluorinated System 2-Butanone (5.43 g) and Desmodur N3300A (10.86 g) are added to a mixer cup and centrifugally mixed for two minutes at 2000 RPM. The resultant solution is homogenous and clear. The solution is poured into a glass jar, an inert gas layer is added, and the container is sealed tightly. This forms Part B of the two-part formula for an alcohol-curable mixed fluorinated and non-fluorinated system.

Example 3C: Spray Coating of Alcohol-Cured Mixed Fluorinated and Non-Fluorinated System Part A (Example 3A, 40.23 g) and Part B (Example 3B, 16.28 g) are added to a mixer cup and centrifugally mixed at 2000 RPM for one minute. The resultant solution is added to a spray gun (Anest Iwata LPH-80) and sprayed onto a substrate containing areas of both aluminum and Declam. Four coats are applied in total.

The substrate is placed into an oven and allowed to cure for four hours at 65° C., forming an alcohol-cured biphasic polymer from the two-part formula. The biphasic polymer coating is approximately 2.5 mils thick (about 64 microns).

Example 3D: Aging and Spray Coating of Alcohol-Cured Mixed Fluorinated and Non-Fluorinated System Part A (Example 3A, 8.00 g) and Part B (Example 3B, 3.24 g) are each aged for 91 days. Following this aging, Part A and Part B are then combined in a mixer cup and centrifugally mixed at 2000 RPM for one minute. The resultant solution is added to a spray gun (Anest Iwata LPH-80) and sprayed onto a substrate containing Declam. Four coats are applied in total.

The substrate is placed into an oven and allowed to cure for four hours at 60° C., forming an alcohol-cured mixed fluorinated and non-fluorinated biphasic polymer from the two-part formula. The biphasic polymer coating is approximately 2.5 mils thick (about 64 microns).

Example 4: Hardness Results of Example 1C, 1D, 2C, 2D, 3C, and 3D Spray Coatings Hardness is measured with a BYK Pencil Hardness Test Kit in accordance with ASTM D3363-22, "Standard Test Method for Film Hardness by Pencil Test", which is incorporated by reference. When two materials of different hardness are forced against each other, one of the materials yields or crumbles, while the other is unaffected. Thus a scale of relative hardness can be established on the basis of the ability of one material to scratch or deform another. In ASTM D3363-22, the test method specifies that pencils with a known hardness grade are moved over the surface to be tested at a fixed angle and pressure. The result is a grade from 9B (softest) to 9H (hardest), on a spectrum.

Measurements are taken on the coatings formed from spraying onto a Declam substrate directly after the solutions are prepared according to Examples 1C, 2C, and 3C, as well as following aging of the solutions, according to Examples 1D, 2D, and 3D. The hardness results are shown in Table 1. It is noted that the hardness of the alcohol-cured biphasic polymer is essentially unchanged after aging (Example 2D versus 2C), and the hardness of the alcohol-cured mixed fluorinated and non-fluorinated biphasic polymer is essentially unchanged after approximately 3 months of aging (Example 3D versus 3C).

Example 5: Visual Inspection of Example 1C, 1D, 2C, 2D, 3C, and 3D Spray Coatings The spray coatings are visually inspected for cosmetic appearance. The visual inspections are done for the coatings formed from spraying onto a Declam substrate directly after the solutions are prepared according to Examples 1C, 2C, and 3C, as well as following aging of the solutions, according to Examples 1D, 2D, and 3D. As summarized in Table 2, all three sets of samples look good and appear almost identical with very glossy finishes and no large scale visual defects (uncured coating, hazing, cratering, bubbling, etc.).

Example 6: Stability of Two-Part Formula Kit

The stability of the formulations is assessed visually after initial preparation and out to 61 days for Part A (Example 1A) and Part B (Example 1B) of the amine-curable biphasic polymer. Likewise, the stability of the formulations is assessed visually after initial preparation and out to 49 days for Part A (Example 2A) and Part B (Example 2B) of the alcohol-curable biphasic polymer.

After these time periods, no settling, separation, or curing is observed in either Part A or Part B for either of the amine-curable two-part formula or the alcohol-curable two-part formula. However, the initial slight yellow tint of the amine-curable Part A (Example 1A) has darkened considerably over time. This result is consistent with the storage characteristics of the Ethacure 100-LC component itself.

TABLE 1

Hardness Results for Example Coatings via ASTM D3363-22

| Formulation | Solution Aging Prior to Spraying (Days) | Hardness Value (ASTM D3363-22) |
|---|---|---|
| Example 1C | 0 | 7H |
| Example 1D | 23 | H |
| Example 2C | 0 | 3H |
| Example 2D | 11 | 2H |
| Example 3C | 0 | 3H |
| Example 3D | 91 | 4H |

TABLE 2

Cosmetic Results for Example Coatings via ASTM D3363-22

| Formulation | Solution Aging Prior to Spraying (Days) | Visual Appearance |
|---|---|---|
| Example 1C | 0 | Good |
| Example 1D | 23 | Good |
| Example 2C | 0 | Good |
| Example 2D | 11 | Good |
| Example 3C | 0 | Good |
| Example 3D | 91 | Good |

There are many commercial applications of antimicrobial surfaces in homes, in restaurants, on clothing and personal protective equipment, in cars, and in airplanes, for example. In one commercial example, the antimicrobial structure is a coating disposed on an automotive dash board. In another commercial example, the antimicrobial structure is a coating disposed on an overhead stowage bin in an aerospace cabin.

In this detailed description, reference has been made to multiple embodiments which show by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein. This patent application hereby incorporates by reference the following patents: U.S. Pat. No. 10,689,542, issued on Jun. 23, 2020; U.S. Pat. No. 11,225,589, issued on Jan. 18, 2022; and U.S. Pat. No. 11,369,109, issued on Jun. 28, 2022.

The embodiments and variations described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A two-part formula for fabricating a biphasic polymer, wherein said two-part formula consists essentially of:
(A) a first liquid volume, wherein said first liquid volume comprises:
(A)(i) a structural phase containing a solid structural polymer;
(A)(ii) a transport phase containing a solid transport polymer;
(A)(iii) a chain extender;
(A)(iv) a curing catalyst;
(A)(v) a first solvent; and
(A)(vi) optionally, first additives; and
(B) a second liquid volume that is volumetrically isolated from said first liquid volume, wherein said second liquid volume comprises:
(B)(i) a crosslinker that is capable of crosslinking said solid structural polymer with said solid transport polymer;
(B)(ii) a second solvent; and
(B)(iii) optionally, second additives.

2. The two-part formula of claim 1, wherein said structural phase has a glass-transition temperature of greater than 20° C.

3. The two-part formula of claim 1, wherein said solid structural polymer is selected from non-fluorinated carbon-based polymers.

4. The two-part formula of claim 3, wherein said non-fluorinated carbon-based polymers are selected from the group consisting of polycarbonates, polyacrylates, polyalkanes, polyurethanes, polyethers, polyureas, polyesters, polyepoxides, and combinations thereof.

5. The two-part formula of claim 1, wherein said solid structural polymer is selected from fluorinated polymers.

6. The two-part formula of claim 5, wherein said fluorinated polymers are selected from the group consisting of fluorinated polyols, perfluorocarbons, perfluoropolyethers, polyfluoroacrylates, polyfluorosiloxanes, polyvinylidene fluoride, polytrifluoroethylene, and combinations thereof.

7. The two-part formula of claim 5, wherein said fluorinated polymers are branched with a functionality greater than 2.

8. The two-part formula of claim 1, wherein said solid transport polymer is a hygroscopic solid transport polymer selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), modified cellulosic polymers, carboxymethyl cellulose, hydroxyethyl cellulose, hydroxypropyl cellulose, methyl cellulose, and combinations thereof.

9. The two-part formula of claim 1, wherein said solid transport polymer is a hydrophobic, non-lipophobic solid transport polymer selected from the group consisting of poly(propylene glycol), poly(tetramethylene glycol), polybutadiene, polycarbonate, polycaprolactone, acrylic polyols, and combinations thereof.

10. The two-part formula of claim 1, wherein said solid transport polymer is a hydrophilic solid transport polymer with ionic charge, and wherein said ionic charge is optionally present within said hydrophilic solid transport polymer as carboxylate groups, amine groups, sulfate groups, or phosphate groups.

11. The two-part formula of claim 1, wherein said solid transport polymer is an electrolyte solid transport polymer selected from the group consisting of polyethylene oxide, polypropylene oxide, polycarbonates, polysiloxanes, polyvinylidene difluoride, and combinations thereof.

12. The two-part formula of claim 1, wherein said cross-linker includes at least one moiety selected from the group consisting of amine, hydroxyl, isocyanate, a blocked isocyanate, epoxide, carbodiimide, and combinations thereof.

13. The two-part formula of claim 1, wherein each of said first solvent and said second solvent is independently selected from the group consisting of water, alcohols, polyols, ethers, esters, ketones, aldehydes, carbonates, lactones, sulfoxides, ionic liquids, and combinations thereof.

14. The two-part formula of claim 1, wherein each of said first additives and said second additives is independently selected from the group consisting of buffers, UV stabilizers, fillers, pigments, flattening agents, flame retardants, salts, surfactants, defoamers, dispersants, wetting agents, antioxidants, adhesion promoters, leveling agents, and combinations thereof.

15. The two-part formula of claim 1, wherein an antimicrobial agent is present within said first liquid volume, within said second liquid volume, or within both said first liquid volume and said second liquid volume.

16. The two-part formula of claim 15, wherein said antimicrobial agent is selected from quaternary ammonium molecules.

17. The two-part formula of claim 15, wherein said antimicrobial agent is selected from metal ions, and wherein said metal ions are optionally selected from the group consisting of silver, copper, zinc, and combinations thereof.

18. The two-part formula of claim 15, wherein said antimicrobial agent is selected from metal oxides, and wherein said metal oxides are optionally selected from copper (I) oxide, copper (II) oxide, zinc oxide, silver oxide, and combinations thereof.

19. The two-part formula of claim 15, wherein said antimicrobial agent is selected from acids, and wherein said acids are optionally selected from the group consisting of citric acid, acetic acid, peracetic acid, glycolic acid, lactic acid, succinic acid, pyruvic acid, oxalic acid, hydrochloric acid, and combinations thereof.

20. The two-part formula of claim 15, wherein said antimicrobial agent is selected from bases, and wherein said bases are optionally selected from the group consisting of ammonia, ammonium hydroxide, sodium hydroxide, potassium hydroxide, sodium bicarbonate, potassium bicarbonate, and combinations thereof.

21. The two-part formula of claim 15, wherein said antimicrobial agent is selected from salts, and wherein said salts are optionally selected from the group consisting of copper chloride, copper nitrate, copper citrate, copper acetate, zinc chloride, zinc nitrate, zinc citrate, zinc acetate, silver chloride, silver nitrate, silver citrate, silver acetate, and combinations thereof.

22. The two-part formula of claim 15, wherein said antimicrobial agent is selected from peroxides, and wherein said peroxides are optionally selected from the group consisting of hydrogen peroxide, organic peroxides, and combinations thereof.

23. The two-part formula of claim 15, wherein said antimicrobial agent is selected from oxidizing molecules, and wherein said oxidizing molecules are optionally selected from the group consisting of hypochlorous acid, hydrogen peroxide, sodium hypochlorite, sodium chlorite, sodium chlorate, calcium hypochlorite, calcium chlorite, calcium chlorate, calcium perchlorate, and combinations thereof.

24. The two-part formula of claim 15, wherein said antimicrobial agent is selected from N-halamines.

* * * * *